United States Patent
Peng et al.

(10) Patent No.: US 12,147,112 B2
(45) Date of Patent: Nov. 19, 2024

(54) TRANSPARENT DISPLAY APPARATUS FOR IMPROVING CONTRAST RATIO AND MANUFACTURING METHOD

(71) Applicant: BOE TECHNOLOGY GROUP CO., LTD., Beijing (CN)

(72) Inventors: Yidan Peng, Beijing (CN); Long Wang, Beijing (CN); Nanfang Jia, Beijing (CN); Zhiliang Wang, Beijing (CN); Yitong Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 114 days.

(21) Appl. No.: 17/789,932

(22) PCT Filed: Jul. 6, 2021

(86) PCT No.: PCT/CN2021/104654
§ 371 (c)(1),
(2) Date: Jun. 29, 2022

(87) PCT Pub. No.: WO2022/033238
PCT Pub. Date: Feb. 17, 2022

(65) Prior Publication Data
US 2023/0044641 A1 Feb. 9, 2023

(30) Foreign Application Priority Data
Aug. 14, 2020 (CN) .......................... 202010818592.3

(51) Int. Cl.
*G02F 1/1335* (2006.01)
*G02F 1/1339* (2006.01)
(Continued)

(52) U.S. Cl.
CPC .. *G02F 1/133512* (2013.01); *G02F 1/133553* (2013.01); *G02F 1/136286* (2013.01);
(Continued)

(58) Field of Classification Search
CPC .............................. G02F 1/1334; G02F 1/133
See application file for complete search history.

(56) References Cited

U.S. PATENT DOCUMENTS

2003/0011553 A1* 1/2003 Ozaki .................. G09G 3/3688
345/89
2006/0044497 A1* 3/2006 Kurasawa ......... G02F 1/136227
349/114
(Continued)

FOREIGN PATENT DOCUMENTS

| CN | 103163701 A | 6/2013 |
|---|---|---|
| CN | 107861286 A | 3/2018 |

(Continued)

OTHER PUBLICATIONS

PCT International Search Report and (w/ English translation) and Written Opinion for corresponding PCT Application No. PCT/CN2021/104654, mailed Sep. 24, 2021, 13 pages.

*Primary Examiner* — Lauren Nguyen
(74) *Attorney, Agent, or Firm* — Dority & Manning, P.A.

(57) ABSTRACT

A transparent display apparatus includes a liquid crystal cell and a Sight source opposite to a side surface of the ceil. The cell Includes a first substrate, first electrodes on the first substrate, a second substrate, a second electrode on the first or second substrata, a liquid crystal layer between the two substrates, signal lines on the first substrate, and a light-shielding pattern on the second substrate. The layer is configured to totally reflect or scatter light from the light source incident to a region, opposite to a first electrode, due to action of an electric field provided by the first and second electrodes. At least one signal line has a bottom surface and a light-reflecting side surface facing the light source, and a slope angle therebetween is acute. The pattern is located in a reflection path after a portion of the light irradiates the light-reflecting side surface.

15 Claims, 24 Drawing Sheets

(51) Int. Cl.
G02F 1/1362 (2006.01)
G02F 1/1368 (2006.01)
G02F 1/137 (2006.01)
G09G 3/34 (2006.01)

(52) U.S. Cl.
CPC ........ G02F 1/1368 (2013.01); G02F 1/13756 (2021.01); G09G 3/3406 (2013.01); *G02F 1/133622* (2021.01); *G02F 1/1339* (2013.01); *G02F 2203/01* (2013.01); *G09G 2300/0426* (2013.01)

(56) References Cited

U.S. PATENT DOCUMENTS

| | | | | |
|---|---|---|---|---|
| 2010/0195037 | A1* | 8/2010 | Imakawa | G02F 1/13394 445/25 |
| 2011/0149224 | A1* | 6/2011 | Tseng | G02F 1/136286 349/143 |
| 2014/0209897 | A1* | 7/2014 | Kubota | G02F 1/1343 257/43 |
| 2017/0062772 | A1 | 3/2017 | Chu et al. | |
| 2017/0115522 | A1* | 4/2017 | Mun | G02F 1/136286 |
| 2017/0176813 | A1 | 6/2017 | Chen et al. | |
| 2018/0217420 | A1 | 8/2018 | Cheng | |
| 2018/0275452 | A1 | 9/2018 | Wang et al. | |
| 2018/0329265 | A1 | 11/2018 | Kaneko et al. | |
| 2019/0079323 | A1* | 3/2019 | Kurokawa | G02F 1/136209 |
| 2019/0294012 | A1 | 9/2019 | Okuyama et al. | |
| 2019/0384096 | A1 | 12/2019 | Que et al. | |
| 2021/0405405 | A1 | 12/2021 | Chiang et al. | |

FOREIGN PATENT DOCUMENTS

| | | |
|---|---|---|
| CN | 109461838 A | 3/2019 |
| CN | 111290185 A | 6/2020 |
| CN | 212255944 U | 12/2020 |

* cited by examiner

210

E-E'

TRANSPARENT DISPLAY APPARATUS FOR IMPROVING CONTRAST RATIO AND MANUFACTURING METHOD

CROSS-REFERENCE TO RELATED APPLICATIONS

This application is a national phase entry under 35 USC 371 of International Patent Application No. PCT/CN2021/104654 filed on Jul. 6, 2021, which claims priority to Chinese Patent Application No. 202010818592.3 filed on Aug. 14, 2020, which are incorporated herein by reference in their entirety.

TECHNICAL FIELD

The present disclosure relates to the field of display technologies, and in particular, to a transparent display apparatus and a manufacturing method.

BACKGROUND

With the development of display technologies, transparent display apparatuses gradually enter the display market. The transparent display apparatus is a display apparatus that enables users to view a display image on the transparent display apparatus and a scene or an object behind the transparent display apparatus simultaneously. The transparent display apparatus may realize fusion and interaction between the display image on a display screen and the scene or the object behind the transparent display apparatus, thereby bringing a brand-new, rich and expressive visual experience to the users.

SUMMARY

In one aspect, a transparent display apparatus is provided. The transparent display apparatus includes a liquid crystal cell and a light source. The light source is disposed opposite to a side surface of the liquid crystal cell. The liquid crystal cell has a display region. The liquid crystal cell includes a first substrate, a second substrate, first electrodes, a second electrode, a liquid crystal layer, a plurality of signal lines and a light-shielding pattern. The first electrodes are disposed on the first substrate. The second electrode is disposed on one of the first substrate and the second substrate. The liquid crystal layer is disposed between the first substrate and the second substrate. The liquid crystal layer includes polymer molecules and liquid crystal molecules. The liquid crystal layer is configured to totally reflect or scatter light emitted by the light source incident to a region, opposite to a first electrode of the first electrodes, in the liquid crystal layer due to action of an electric field provided by the first electrode and the second electrode. The plurality of signal lines are disposed on the first substrate and in the display region. At least one signal line of the plurality of signal lines has a bottom surface proximate to the first substrate and a light-reflecting side surface connected to the bottom surface and facing the light source. A slope angle provided by the light-reflecting side surface and the bottom surface is an acute angle. The light-shielding pattern is disposed on the second substrate, and the light-shielding pattern is located in a reflection path after a portion of the light emitted by the light source irradiates the light-reflecting side surface.

In some embodiments, an orthogonal projection of the at least one signal line on the first substrate is within an orthogonal projection of the light-shielding pattern on the first substrate.

In some embodiments, an orthogonal projection of the at least one signal line on the first substrate has a first edge and a second edge. An orthogonal projection of a corresponding portion of the light-shielding pattern on the first substrate has a third edge and a fourth edge, and the corresponding portion of the light-shielding pattern is a portion of the light-shielding pattern whose orthogonal projection on the first substrate overlaps with the orthogonal projection of the at least one signal line. In a width direction of the at least one signal line, the first edge and the second edge are located opposite to each other. The third edge is located on a side of the first edge away from the second edge, and the fourth edge is located on a side of the second edge away from the first edge. A sum of a distance between the third edge and the first edge and a distance between the fourth edge and the second edge is greater than or equal to 6 μm.

In some embodiments, the distance between the third edge and the first edge is equal to the distance between the fourth edge and the second edge.

In some embodiments, a ratio of a width of a bottom surface, proximate to the second substrate, of the corresponding portion of the light-shielding pattern to a width of the bottom surface of the at least one signal line ranges from 1 to 2.5, inclusive.

In some embodiments, a relationship between a width d of the bottom surface of the at least one signal line and a width D of a bottom surface, proximate to the second substrate, of the corresponding portion of the light-shielding pattern is $D=2L\times\tan(2\gamma+\alpha-90°)+d$, where L is a distance between the bottom surface of the at least one signal line and the bottom surface, proximate to the second substrate, of the corresponding portion of the light-shielding pattern; $\gamma$ is the slope angle provided by the light-reflecting side surface and the bottom surface of the at least one signal line; $\alpha$ is an included angle between the portion of the light incident on the light-reflecting side surface of the at least one signal line and the bottom surface of the at least one signal line.

In some embodiments, $\alpha$ is greater than or equal to 0 degrees and less than or equal to 60 degrees ($0°\leq\alpha\leq60°$); and $\gamma$ is greater than or equal to 45 degrees and less than or equal to 80 degrees ($45°\leq\gamma\leq80°$).

In some embodiments, a material of the plurality of signal lines includes a metal.

In some embodiments, the plurality of signal lines include gate lines and data lines. An extending direction of the gate lines intersects an extending direction of the signal lines.

In some embodiments, the display region includes a plurality of pixel regions, and each pixel region is provided with a first electrode of the first electrodes therein. The liquid crystal cell further includes thin film transistors disposed on the first substrate, and each pixel region is further provided with a thin film transistor of the thin film transistors therein. The thin film transistor is closer to the first substrate than the first electrode. The thin film transistor includes a gate, an active layer, a source and a drain. The gate of the thin film transistor is coupled to a gate line of the gate lines, the source of the thin film transistor is coupled to a data line of the data lines, and the drain of the thin film transistor is coupled to the first electrode.

In some embodiments, an orthogonal projection of the thin film transistor on the first substrate is within an orthogonal projection of the light-shielding pattern on the first substrate.

In some embodiments, the plurality of signal lines further include power lines. The power lines and the data lines extend in the same direction and are disposed at intervals. The power lines are made of a same material as the data lines.

In some embodiments, the liquid crystal cell further includes first conductive patterns, second conductive patterns and third conductive patterns. The first conductive patterns are disposed on a same layer as the first electrodes. The second conductive patterns are disposed on another same layer as the data lines. The third conductive patterns are disposed on yet another same layer as the gate lines. A first conductive pattern of the first conductive patterns is coupled to a power line of the power lines and a third conductive pattern of the third conductive patterns. A second conductive pattern of the second conductive patterns is coupled to the drain of the thin film transistor. An orthogonal projection of the third conductive pattern on the first substrate overlaps with an orthogonal projection of the second conductive pattern on the first substrate.

In some embodiments, the orthogonal projection of the second conductive pattern on the first substrate and the orthogonal projection of the third conductive pattern on the first substrate are within an orthogonal projection of the light-shielding pattern on the first substrate.

In some embodiments, the first conductive patterns and the gate lines extend in the same direction. The first conductive pattern includes unshielded portions each located between two adjacent first electrodes of the first electrodes. An orthogonal projection of the unshielded portion on the first substrate is non-overlapping with the orthogonal projection of the second conductive pattern on the first substrate and the orthogonal projection of the third conductive pattern on the first substrate. An orthogonal projection of the unshielded portion on the second substrate is non-overlapping with an orthogonal projection of the light-shielding pattern on the second substrate.

In some embodiments, the second electrode is located on the second substrate, and the second electrode is closer to the first substrate than the light-shielding pattern.

The second electrode includes a second electrode body and a plurality of openings disposed in the second electrode body. The plurality of openings include at least one type of: first openings, second openings and third openings. The liquid crystal cell further includes thin film transistors, an orthogonal projection of a first opening of the first openings on the first substrate substantially coincides with an orthogonal projection of a thin film transistor of the thin film transistors on the first substrate. The plurality of signal lines include gate lines and data lines, an orthogonal projection of a second opening of the second openings on the first substrate overlaps with an orthogonal projection of a data line of the data lines on the first substrate, and an orthogonal projection of a third opening of the third openings on the first substrate overlaps with an orthogonal projection of a gate line of the gate lines on the first substrate.

In some embodiments, an orthogonal projection of the at least one of the plurality of openings on the second substrate is non-overlapping with an orthogonal projection of the light-shielding pattern on the second substrate.

In some embodiments, the liquid crystal cell further includes a plurality of post spacers and first conductive patterns disposed in a same layer as the first electrodes. The plurality of post spacers are disposed on the second substrate, and the plurality of post spacers are farther from the second substrate than the light-shielding pattern. An orthogonal projection of a post spacer of the plurality of post spacers on the first substrate overlaps with an orthogonal projection of a first conductive pattern of the first conductive patterns on the first substrate. Orthogonal projections of the plurality of post spacers on the second substrate are non-overlapping with an orthogonal projection of the light-shielding pattern on the second substrate.

In some embodiments, the light source includes first color light-emitting devices, second color light-emitting devices and third color light-emitting devices. The light source is configured such way that the first color light-emitting devices, the second color light-emitting devices and the third color light-emitting devices emit light with respective colors sequentially and periodically, in response to a pulse control signal.

In another aspect, a method of manufacturing a transparent display apparatus is provided. The method includes: forming a plurality of signal lines on a first substrate and in a display region; forming a light-shielding pattern on a second substrate; forming first electrodes on the first substrate, and forming a second electrode on one of the first substrate and the second substrate; forming a liquid crystal layer between the first substrate and the second substrate to obtain a liquid crystal cell; and providing a light source opposite to a side surface of the liquid crystal cell to obtain the transparent display apparatus. At least one signal line of the plurality of signal lines has a bottom surface proximate to the first substrate and a light-reflecting side surface connected to the bottom surface and facing the light source. A slope angle provided by the light-reflecting side surface and the bottom surface is an acute angle. The light-shielding pattern is located in a reflection path after a portion of light emitted by the light source irradiates the light-reflecting side surface. The liquid crystal layer includes polymer molecules and liquid crystal molecules. The liquid crystal layer is configured to totally reflect or scatter the light emitted by the light source incident to a region, opposite to a first electrode of the first electrodes, in the liquid crystal layer due to action of an electric field provided by the first electrode and the second electrode.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person having ordinary skill in the art may obtain other drawings according to these drawings. In addition, the accompanying drawings in the following description may be regarded as schematic diagrams, and are not limitations to actual sizes of products, actual processes of methods or actual timings of signals to which the embodiments of the present disclosure relate.

DETAILED DESCRIPTION

Figure 1:
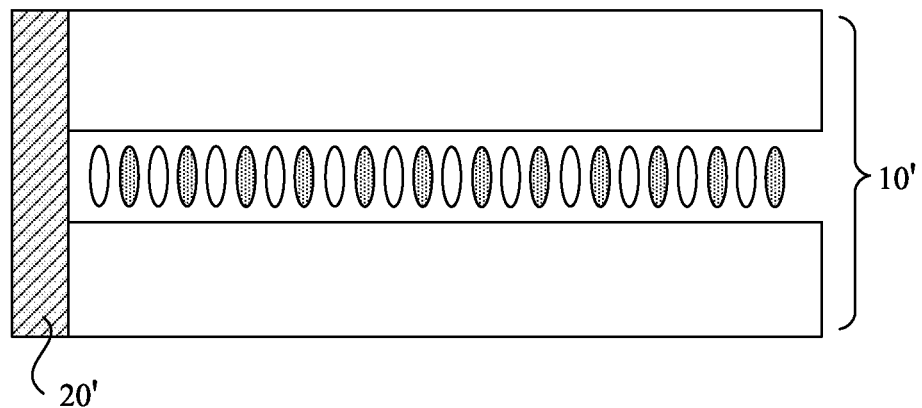
FIG. 1 is a structural diagram of a transparent display apparatus in the related art.

Technical solutions in some embodiments of the present disclosure will be described clearly and completely with reference to the accompanying drawings below. However, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined with the terms such as "first" and "second" may explicitly or implicitly include one or more of the features. In the description of the embodiments of the present disclosure, the term "a/the plurality of" means two or more unless otherwise specified.

In the description of some embodiments, terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of "applicable to" or "configured to" herein means an open and inclusive expression, which does not exclude devices that are applicable to or configured to perform additional tasks or steps.

The term "substantially", "about" or "approximately" as used herein includes a stated value and an average value within an acceptable range of deviation of a particular value. The acceptable range of deviation is determined by a person of ordinary skill in the art in view of the measurement in question and the error associated with a particular amount of measurement (i.e., the limitations of the measurement system).

Exemplary embodiments are described herein with reference to sectional views and/or plan views as idealized exemplary drawings. In the accompanying drawings, thickness of layers and regions are enlarged for clarity. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

When a transparent display apparatus is in an operating state, an image (also referred to as a figure or picture) can be displayed, so that a viewer can see the image displayed by the transparent display apparatus, and a real scene (e.g., an object placed, a person passing by, etc.) at a side of the transparent display apparatus facing away from the viewer; and when the transparent display apparatus is in a non-operating state, the transparent display apparatus is in a transparent or semi-transparent state, like a piece of glass, so that the viewer can see the real scene at the other side through the transparent display apparatus.

In the related art, as shown in FIG. 1, the transparent display apparatus 1' includes a liquid crystal cell 10' and a light source 20'. In a direction perpendicular to a thickness direction of the liquid crystal cell 10', the light source 20' is located on a side surface of the liquid crystal cell 10', and light enters the liquid crystal cell 10' from the side surface of the liquid crystal cell 10'. Since some film layers (such as metal wiring layers, etc.) in the liquid crystal cell 10' will reflect or scatter light during propagation of the light emitted by the light source 20' in the liquid crystal cell 10', stray light is generated. In a case where the stray light is directed to a light exit surface of the liquid crystal cell 10' and exits from the liquid crystal cell 10', during the process of a user viewing the transparent display apparatus 1', the stray light may enter human eyes, resulting in a decrease in the display contrast ratio and affecting the user's viewing effect.

Figure 2:
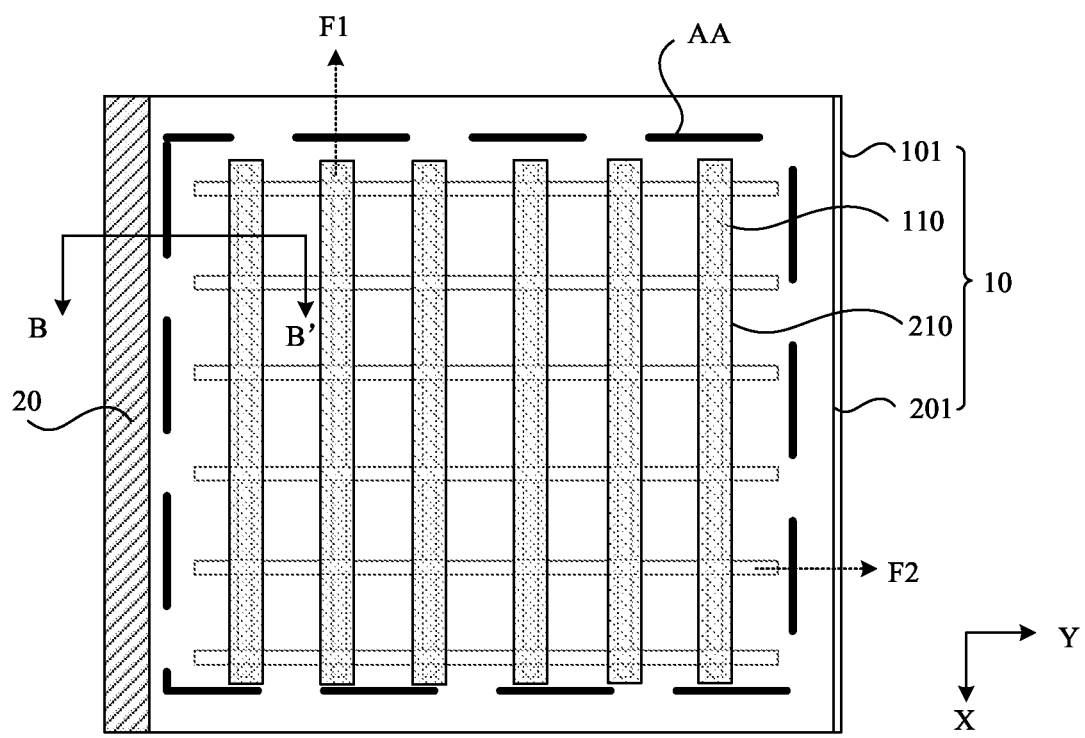
FIG. 2 is a structural diagram of a transparent display apparatus, in accordance with some embodiments of the present disclosure.
Figure 3:
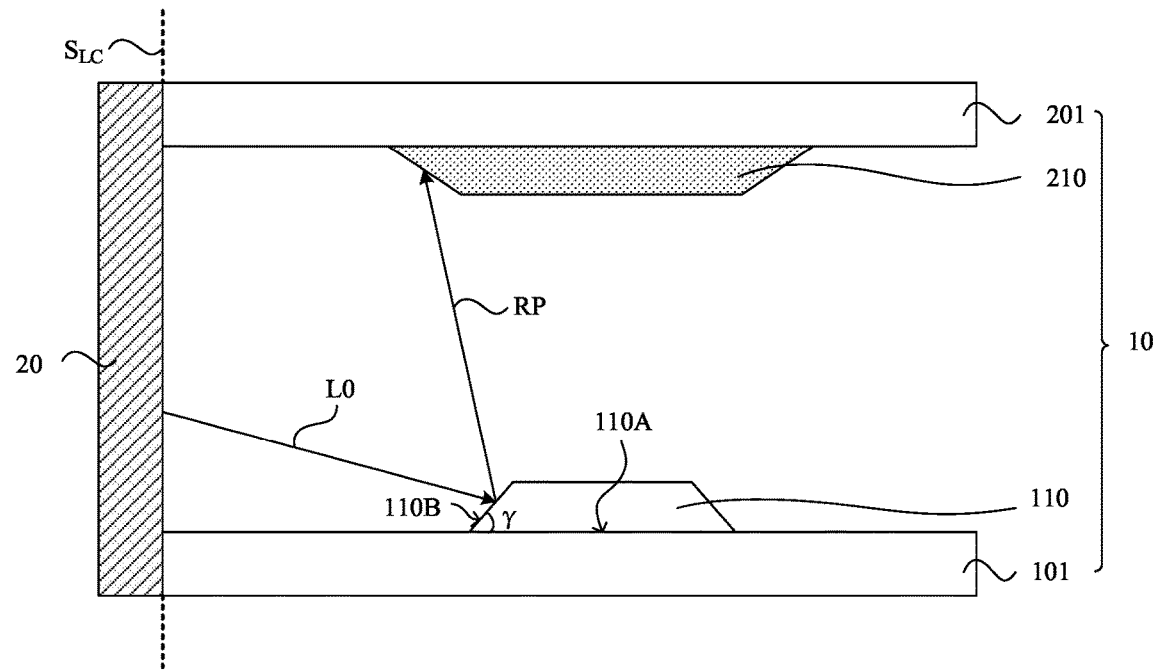
FIG. 3 is a sectional view of the transparent display apparatus in FIG. 2 taken along the line B-B'.

Embodiments of the present disclosure provide a transparent display apparatus 1. As shown in FIGS. 2 and 3, the transparent display apparatus 1 includes a liquid crystal cell 10 and a light source 20. The light source 20 is disposed opposite to a side surface $S_{LC}$ of the liquid crystal cell 10. For example, a thickness of the light source 20 is greater than or equal to a thickness of the liquid crystal cell 10.

It may be understood that the liquid crystal cell 10 has a light exit surface and a bottom surface. In a thickness direction of the liquid crystal cell 10, the light exit surface and the bottom surface are located opposite to each other, and the side surface $S_{LC}$ of the liquid crystal cell 10 is located between the light exit surface and the bottom surface. In a direction perpendicular to the thickness direction of the liquid crystal cell 10, the light source 20 is disposed opposite to the side surface of the liquid crystal cell 10.

As shown in FIGS. 2 and 3, the liquid crystal cell 10 has a display region (active area (AA)). The liquid crystal cell 10 includes a first substrate 101 and a second substrate 201. The first substrate 101 is disposed opposite to the second substrate 201.

Figure 4:
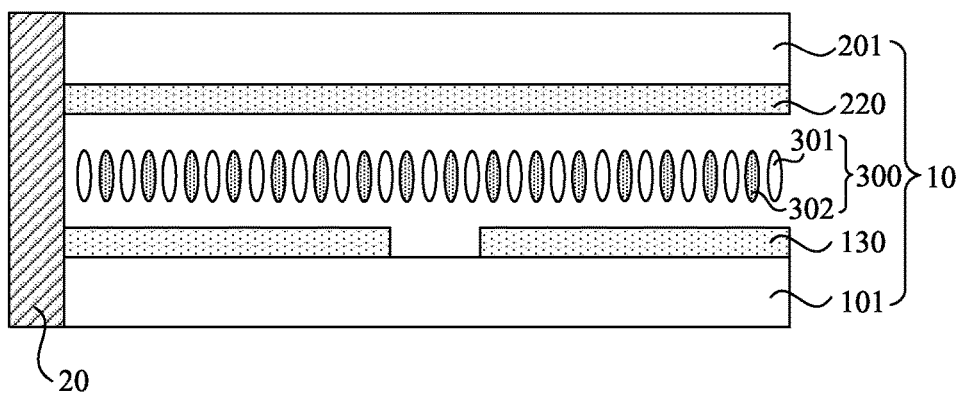
FIG. 4 is a structural diagram of another transparent display apparatus, in accordance with some embodiments of the present disclosure.

As shown in FIG. 4, the liquid crystal cell 10 further includes first electrodes 130 and a second electrode 220. For example, the first electrodes 130 are pixel electrodes and the second electrode 220 is a common electrode. The first electrodes 130 and the second electrode 220 may all be located on the first substrate 101, and the first electrodes 130 and the second electrode 220 may be located in a same layer or in different layers. In this case, an array substrate including the first substrate 101, the first electrodes 130 and the second electrode 220, and an opposite substrate including the second substrate 201 may be obtained. Alternatively, the first electrodes 130 are located on the first substrate 101 and the second electrode 220 is located on the second substrate 201. In this case, an array substrate including the first substrate 101 and the first electrodes 130, and an opposite substrate including the second substrate 201 and the second electrode 220 may be obtained.

All the first electrodes 130 and the second electrode 220 are transparent. The materials of the first electrodes 130 and the second electrode 220 may all be transparent conductive materials, for example, indium tin oxide (ITO).

As shown in FIG. 4, the liquid crystal cell 10 further includes a liquid crystal layer 300. The liquid crystal layer 300 is sandwiched between the first substrate 101 and the second substrate 201. That is, the liquid crystal layer 300 is located between an array substrate and an opposite substrate opposite to each other. The liquid crystal layer 300 includes liquid crystal molecules 301 and polymer molecules 302. For example, the liquid crystal layer 300 may employ polymer stabilized liquid crystal (PSLC) or polymer-dispersed liquid crystal (PDLC). The liquid crystal layer 300 is configured to totally reflect or scatter light incident to a region, opposite to a first electrode 130, in the liquid crystal layer 300 due to action of an electric field provided by the first electrode 130 and the second electrode 220.

It may be understood that, in a case where the liquid crystal cell 10 does not display images, an electric field with zero intensity is formed between the first electrodes 130 and the second electrode 220, so a refractive index of the liquid crystal molecules 301 is the same as a refractive index of the polymer molecules 302. In this case, the light from the light source 20 is totally reflected and propagates in the liquid crystal cell 10, and will not be emitted from a side of the second substrate 201 away from the first substrate 101. That is, the AA region is in a transparent state. For example, in a case where the AA region is in the transparent state, a transmittance of the transparent display apparatus 1 may be above 65%. In a case where the transparent display apparatus 1 display images, first electrode(s) 130 in a region where an image is to be displayed and the second electrode 220 are each applied with an electric signal to form an electric field with non-zero intensity, so the refractive index of liquid crystal molecules 301 within the electric field is changed. As a result, the light incident to the liquid crystal molecules is scattered, and the scattered light is emitted from the side of the second substrate 201 away from the first substrate 101, thereby realizing the display of the transparent display apparatus 1. In this case, the region where the image is to be displayed is in a scattering state, and an electric field with zero intensity is formed between first electrodes 130 in the remaining regions where no image is to be displayed and the second electrode 220, so that light incident to the regions where no image is to be displayed is totally reflected. In this case, the regions where no image is to be displayed are in the transparent state.

It will be noted that FIG. 4 is only a schematic diagram, which does not show the specific structure of film layers in the liquid crystal cell 10, nor a distribution of the liquid crystal molecules 301 and the polymer molecules 302 in the liquid crystal layer 300. In practical applications, the specific structure and the distribution may be designed as needed.

As shown in FIGS. 2 and 3, the liquid crystal cell 10 further includes a plurality of signal lines 110 disposed on the first substrate 101 and located in the AA region. As shown in FIG. 3, at least one signal line 110 of the plurality of signal lines 110 has a bottom surface 110A and a light-reflecting side surface 110B. The bottom surface 110A is a surface of the at least one signal line 110 proximate to the first substrate 101. The light-reflecting side surface 110B is connected to the bottom surface 110A, and the light-reflecting side surface 110B faces the light source 20. A slope angle γ provided by the light-reflecting side surface 110B and the bottom surface 110A is an acute angle.

It may be understood that, an orthogonal projection of the light-reflecting side surface 110B on a plane where a light exit surface of the light source 20 is located has a certain area, that is, a shape of the orthogonal projection is a figure with a certain area, not a line segment.

As shown in FIGS. 2 and 3, the liquid crystal cell 10 further includes a light-shielding pattern 210 disposed on the second substrate 201. The light-shielding pattern 210 is located in a reflection path RP after a portion of the light L0 emitted by the light source 20 irradiates the light-reflecting side surface 110B.

It will be noted that for convenience of description, FIG. 3 only shows the first substrate 101, the signal line 110, the second substrate 201 and the light-shielding pattern 210, which does not show other film layer structures in the liquid crystal cell 10.

For example, the first substrate 101 and the second substrate 201 may include a rigid substrate (also referred to as a hard substrate), such as glass, or a flexible substrate, such as polyimide (PI), which may further include a film, such as a buffer layer, disposed on the rigid substrate or the flexible substrate. The light-shielding pattern 210 may be a black matrix (BM), and a material of the light-shielding pattern 210 may include resin. A light transmittance of the light-shielding pattern 210 is low, for example, the transmittance of the light-shielding pattern 210 with a thickness of 1 μm is 0.0001.

It may be understood that the light exit surface of the light source 20 is proximate to the side surface the liquid crystal cell 10, and the light emitted by the light source 20 will enter the liquid crystal cell 10 and propagate in a direction perpendicular to the thickness direction the liquid crystal cell 10. The light-reflecting side surface 110B is proximate to the light exit surface of the light source 20, and light emitted by the light source 20 will irradiate the light-reflecting side surface 110B, and then reflected by the light-reflecting side surface 110B of the signal line 110. Since the slope angle γ provided by the light-reflecting side surface 110B and the bottom surface 110A is the acute angle, the light reflected by the light-reflecting side surface 110B will be emitted to the second substrate 201. In this case, since the light-shielding pattern 210 is located in the reflection path after the light emitted by the light source 20 irradiates the light-reflecting side surface 110B, the light-shielding pattern 210 may shield the light reflected by the light-reflecting side surface 110B, so as to avoid affecting a display effect due to the reflected light emitting from the liquid crystal cell 10, thereby improving a contrast ratio of the transparent display apparatus 1 and improving the user's viewing effect.

Therefore, in the transparent display apparatus 1 provided by the embodiments of the present disclosure, the light-reflecting side surface 110B of the at least one signal line 110 in the liquid crystal cell 10 faces the light source 20, so that the light emitted by the light source 20 is reflected by the light-reflecting side surface 110B of the signal line 110. Moreover, the slope angle γ provided by the light-reflecting side surface 110B and the bottom surface 110A is the acute angle, thus the light reflected by the light-reflecting side surface 110B will be emitted to the second substrate 201. Since the light-shielding pattern 210 is located in the reflection path after the light emitted by the light source 20 irradiates the light-reflecting side surface 110B, the light-shielding pattern 210 may shield the light reflected by the light-reflecting side surface 110B, so as to avoid affecting the display effect due to the reflected light emitting from the liquid crystal cell 10, thereby improving the contrast ratio of the transparent display apparatus 1 and improving the user's viewing effect.

Figure 5:
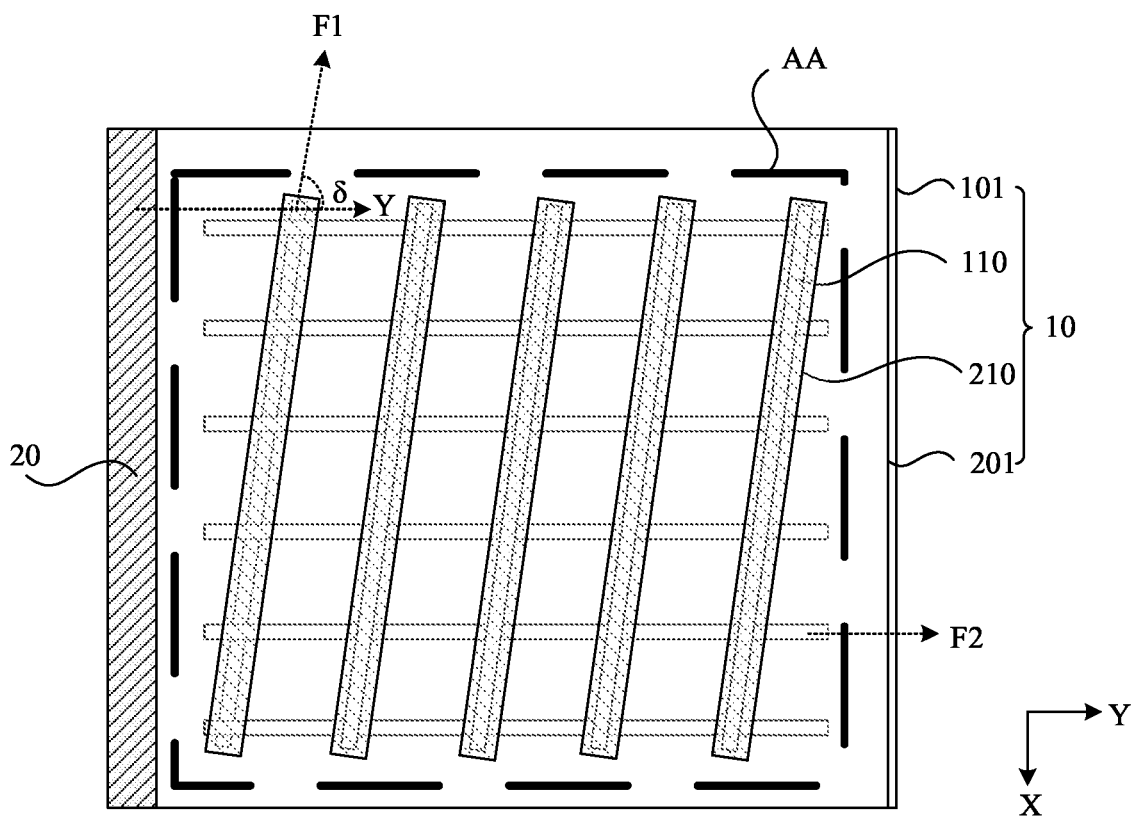
FIG. 5 is a structural diagram of yet another transparent display apparatus, in accordance with some embodiments of the present disclosure.

In some embodiments, as shown in FIGS. 2 and 5, some signal lines 110 of the plurality of signal lines 110 have a first extending direction F1. The first extending direction F1 and a normal direction (e.g., the Y direction in FIG. 2) of the side surface, disposed opposite to the light source 20, of the liquid crystal cell 10 are perpendicular to each other (as shown in FIG. 2), or intersect to each other and provide an acute angle as an included angle δ (as shown in FIG. 5). Orthogonal projections of the signal lines 110 having the first extending direction F1 on the first substrate 101 are within an orthogonal projection of the light-shielding pattern 210 on the first substrate 101.

It may be understood that, a side surface, proximate to the light source 20, of two opposite side surfaces of a signal line 110 (the signal line may be regarded as a first signal line) having the first extending direction F1 in a width direction (i.e., in a direction perpendicular to the first extending direction F1 in a plane where the first substrate 101 is located) is a light-reflecting side 110B.

Figure 6:
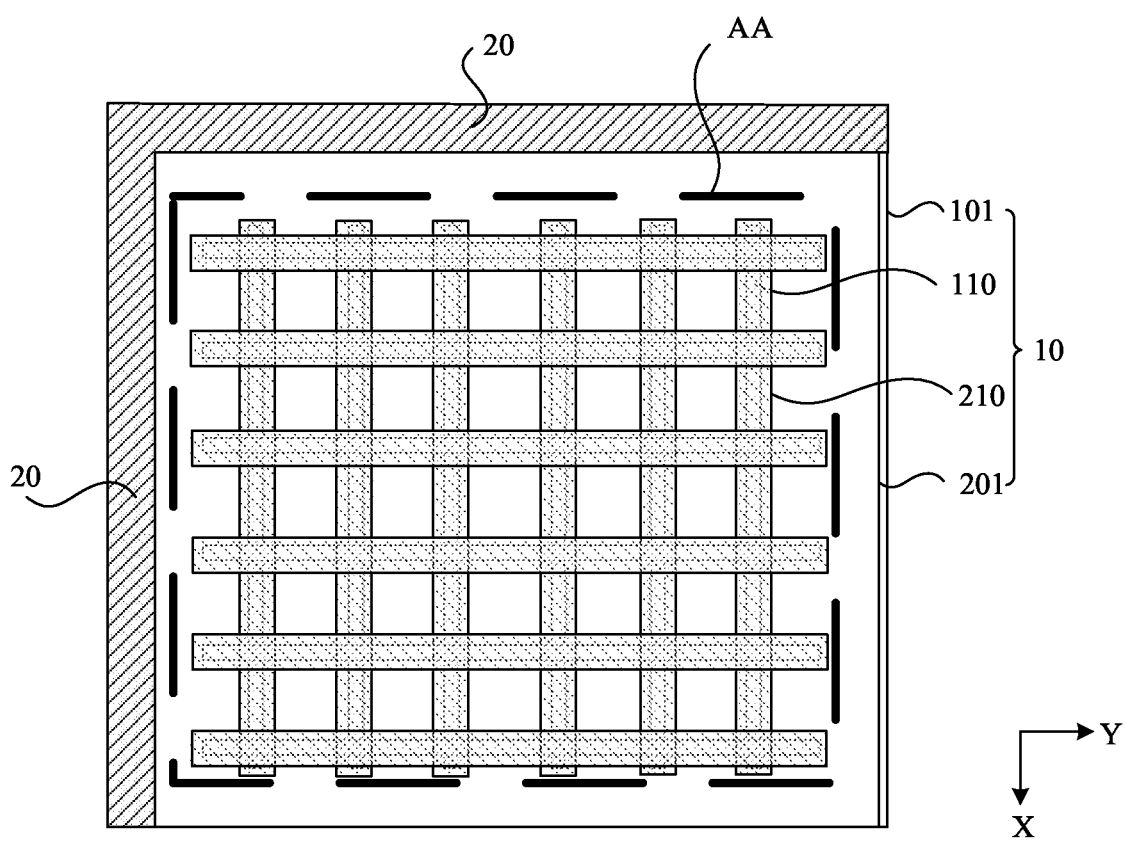
FIG. 6 is a structural diagram of yet another transparent display apparatus, in accordance with some embodiments of the present disclosure.

For example, the light source 20 may include at least one light bar. The transparent display apparatus 1 may include at least one light source 20, and a single light source 20 is disposed opposite to a side surface of the liquid crystal cell 10. For example, as shown in FIG. 2, the transparent display apparatus 1 includes a single light source 20; the light source 20 is located on a side surface of the liquid crystal cell 10. As shown in FIG. 6, the transparent display apparatus 1 includes two light sources 20; the two light sources 20 are respectively located on two connected side surfaces of the liquid crystal cell 10, and are connected to each other in an integrated structure.

It may be understood that, since a normal direction of the light exit surface of the light source 20 is substantially parallel to the normal direction of the side surface, disposed opposite to the light source 20, of the liquid crystal cell 10, a propagation direction of the light emitted by the light source 20 is substantially parallel to the normal direction of the side surface, disposed opposite to the light source 20, of the liquid crystal cell 10, and the propagation direction of the light emitted by the light source 20 is perpendicular to or intersects the first extending direction F1. In this case, the orthogonal projections of the signal lines 110 having the first extending direction F1 on the first substrate 101 are within the orthogonal projection of the light-shielding pattern 210 on the first substrate 101. Therefore, after the light emitted by the light source 20 irradiates the light-reflecting side surfaces 110B of the signal lines 110 having the first extending direction F1, the light reflected by the light-reflecting side surfaces 110B is shielded by the light-shielding pattern 210 without being emitted from the liquid crystal cell 10, and the reflected light is prevented from affecting the user's viewing effect, thereby improving the display effect of the transparent display apparatus 1.

Figure 7:
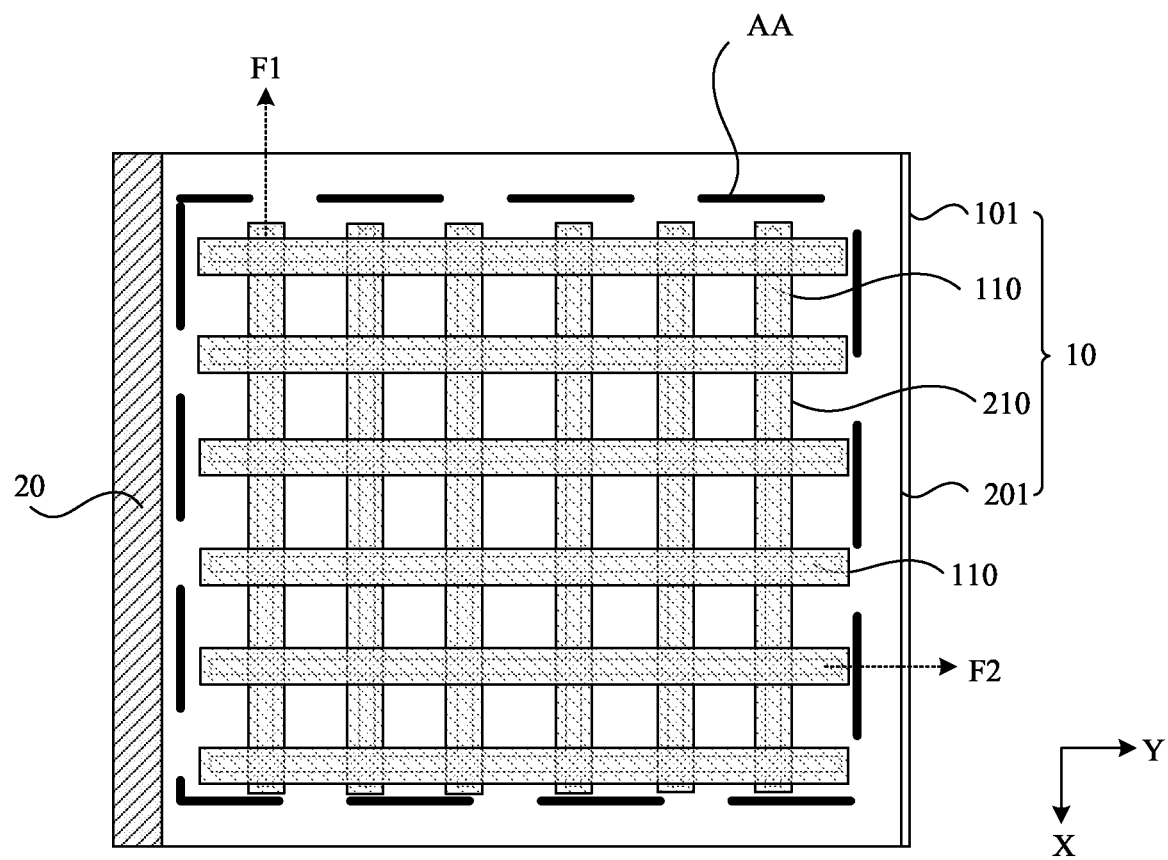
FIG. 7 is a structural diagram of yet another transparent display apparatus, in accordance with some embodiments of the present disclosure.

In some embodiments, as shown in FIGS. 2 and 7, some other signal lines 110 (these signal lines may be regarded as second signal lines) of the plurality of signal lines 110 have a second extending direction F2. The second extending direction F2 is parallel or substantially parallel to the normal direction (e.g., the Y direction in FIG. 2) of the side surface, disposed opposite to the light source 20, of the liquid crystal cell 10.

It may be understood that, since the normal direction of the light exit surface of the light source 20 is substantially parallel to the normal direction of the side surface, disposed opposite to the light source 20, of the liquid crystal cell 10, a propagation direction of the light emitted by the light source 20 is parallel or substantially parallel to the normal direction of the side surface, disposed opposite to the light source 20, of the liquid crystal cell 10, and the propagation direction of the light emitted by the light source 20 is parallel or substantially parallel to the second extending direction F2.

As shown in FIG. 7, the orthogonal projections of the signal lines 110 having the second extending direction F2 on the first substrate 101 are within the orthogonal projection of the light-shielding pattern 210 on the first substrate 101. In this case, since the signal lines 110 having the second extending direction F2 may reflect light, the light emitted by the light source 20 will be reflected when irradiates the signal lines 110, and the reflected light will be directed to the second substrate 201, and emitted from the liquid crystal cell 10. In this case, the light-shielding pattern 210 may shield the light reflected by the signal lines 110 having the second extending direction F2, so as to avoid a problem of lowering the display contrast ratio due to an emission of the reflected light.

Alternatively, as shown in FIG. 2, the orthogonal projection of the light-shielding pattern 210 on the first substrate 101 is non-overlapping with the orthogonal projections of the signal lines 110 having the second extending direction F2 on the first substrate 101. In this case, since the propagation direction of the light emitted by the light source 20 is parallel or substantially parallel to the second extending direction F2, an area where the light emitted by the light source 20 irradiates the signal lines 110 having the second extending direction F2 is small, and small or no light is reflected by the signal lines 110 having the second extending direction F2. In this case, the orthogonal projection of the light-shielding pattern 210 on the first substrate 101 is non-overlapping with orthogonal projections of the signal lines 110 having the second extending direction F2 on the first substrate 101, thus, the influences of the light-shielding pattern 210 with a low transmittance on an aperture ratio and the transmittance of the transparent display apparatus 1 may be avoided, thereby increasing the aperture ratio of the transparent display apparatus 1 and improving the transmittance and transparency of the transparent display apparatus 1.

For example, In a case where the orthogonal projections of the signal lines 110 having the first extending direction F1 on the first substrate 101 are within the orthogonal projection of the light-shielding pattern 210 on the first substrate 101, the aperture ratio of the transparent display apparatus 1 may be increased by 5.64% as compared with a case where orthogonal projections of all signal lines 110 on the first substrate 101 are within the orthogonal projection of the light-shielding pattern 210 on the first substrate 101.

It will be noted that, for two signal lines 110 crossing with each other, in a case where the orthogonal projection of the light-shielding pattern 210 on the first substrate 101 overlaps with an orthogonal projection of one of the signal lines 110 on the first substrate 101, an orthogonal projection of the other signal line 110 on the first substrate 101 inevitably overlaps with the orthogonal projection of the light-shielding pattern 210 on the first substrate 101 at a location where the two signal lines 110 cross, it is approximately assumed that in the embodiments of the present disclosure, the orthogonal projection of the other signal line 110 on the first substrate 101 is non-overlapping with the orthogonal projection of the light-shielding 210 on the first substrate 101. For example, as shown in FIG. 2, an orthogonal projection of a signal line 110 having the first extending direction F1 on the first substrate 101 overlaps with an orthogonal projection of a signal line 110 having the second extending direction F2 on the first substrate 101. In this case, in a case where the orthogonal projection of the signal line 110 having the first extending direction F1 on the first substrate 101 is within the orthogonal projection of the light-shielding pattern 210 on the first substrate 101, the orthogonal projection of the light-shielding pattern 210 on the first substrate 101 inevitably overlaps with a portion, overlapping with the orthogonal projection of the signal line 110 having the first extending direction F1 on the first substrate 101, of the orthogonal projection of the signal line 110 having the second extending direction F2 on the first substrate 101. In this case, it is considered that the orthogonal projection of the light-shielding pattern 210 on the first substrate 101 is non-overlapping with the orthogonal projection of the signal line 110 having the second extending direction F2 on the first substrate 101.

For example, a material of the plurality of signal lines 110 includes metal, such as, aluminum (Al), molybdenum (Mo), copper (Cu), silver (Ag), or the like. In this case, since metal can reflect light, the light emitted by the light source 20 will all be reflected when irradiates the signal lines 110, and the reflected light may be shielded by the light-shielding pattern 210 covering the signal lines 110, so as to prevent the reflected light from emitting from the liquid crystal cell 10.

Figure 8:
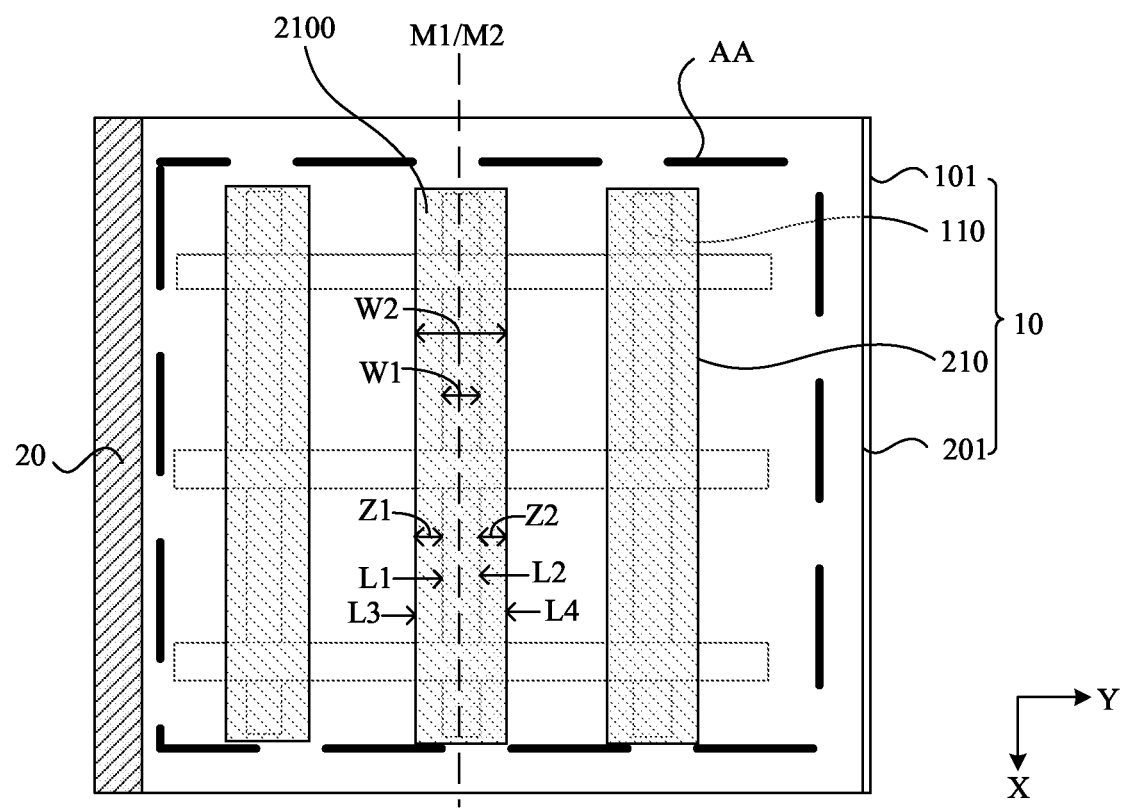
FIG. 8 is a structural diagram of yet another transparent display apparatus, in accordance with some embodiments of the present disclosure.

In some embodiments, referring to FIG. 8, an orthogonal projection of at least one signal line 110 of the plurality of signal lines 110 on the first substrate 101 is within the orthogonal projection of the light-shielding pattern 210 on the first substrate 101. For example, a width W1 of the orthogonal projection of the at least one signal line 110 on the first substrate 101 is less than or equal to a width W2 of an orthogonal projection of a corresponding portion 2100 of the light-shielding pattern 210 on the first substrate 101, i.e., W1≤W2. The corresponding portion of the light-shielding pattern 210 is a portion of the light-shielding pattern 210 whose orthogonal projection on the first substrate 101 overlaps with the orthogonal projection of the at least one signal line 110.

It may be understood that, a region of the light reflected by the signal line 110 shielded by the light-shielding pattern 210 is greater than or equal to a region where the signal line 110 is located, so that the reflected light may be completely shielded, and a shielding effect of the light-shielding pattern 210 on the reflected light is improved, thereby improving the display effect of the transparent display apparatus 1.

In some embodiments, as shown in FIG. 8, the orthogonal projection of the at least one signal line 110 on the first substrate 101 has a first edge L1 and a second edge L2. The first edge L1 and the second edge L2 are located opposite to each other in a width direction of the at least one signal line 110 (e.g., the Y direction in FIG. 8, or a direction perpendicular to an extending direction of the at least one signal line 110 in a plane where the first substrate 101 is located).

The orthogonal projection of the corresponding portion 2100 of the light-shielding pattern 210 on the first substrate 101 has a third edge L3 and a fourth edge L4. The third edge L3 is located on a side of the first edge L1 away from the second edge L2, and the fourth edge L4 is located on a side of the second edge L2 away from the first edge L1. For example, the first edge L1 and the third edge L3 extend in a same direction (for example, the first edge L1 is parallel to the third edge L3), and the second edge L2 and the fourth edge L4 extend in a same direction (for example, the second edge L2 is parallel to the fourth edge L4). In this case, the width W1 of the orthogonal projection of the at least one signal line 110 on the first substrate 101 is less than the width W2 of the orthogonal projection of the corresponding portion 2100 of the light-shielding pattern 210 on the first substrate 101, i.e., W1<W2.

A sum of a distance (i.e., a first distance Z1) between the third edge L3 and the first edge L1 and a distance (i.e., a second distance Z2) between the fourth edge L4 and the second edge L2 is greater than or equal to 6 μm. That is, the sum of the first distance Z1 and the second distance Z2 is greater than or equal to 6 μm, i.e., (Z1+Z2)≥6 μm.

For example, the sum of the first distance Z1 and the second distance Z2 ranges from 6 μm to 12 μm, inclusive. For example, the sum of the first distance Z1 and the second distance Z2 is 6.5 μm, 8 μm or 10 μm.

It may be understood that, the width of the portion, overlapping with the signal line 110, of the orthogonal projection of the light-shielding pattern 210 on the first substrate 101 is greater than a width of the signal line 110. In this way, in the direction perpendicular to the extending direction of the at least one signal line 110, outer sides of two opposite sides of the signal line 110 are covered by the light-shielding pattern 210, so that the light reflected by an outer side of the first edge L1 and an outer side of the second edge L2 of the signal line 110 may be all shielded by the light-shielding pattern 210. A shielding range of the light-shielding pattern 210 for the light reflected by the signal line 110 is increased, so that the reflected light may be completely shielded, and a shielding effect of the light-shielding pattern 210 on the reflected light is improved, thereby improving the display effect of the transparent display apparatus 1.

In some embodiments, the distance (i.e., the first distance Z1) between the third edge L3 and the first edge L1 is equal to the distance (i.e., the second distance Z2) between the fourth edge L4 and the second edge L2. That is, the first distance Z1 is equal to the second distance Z2, i.e., Z1=Z2. The first distance Z1 and the second distance Z2 are both greater than 3 μm. For example, Z1 is equal to Z2 and ranges from 3 μm to 6 μm, inclusive, such as 3.5 μm, 4 μm or 5 μm.

It may be understood that, for a signal line 110 whose orthogonal projection on the first substrate 101 is within the orthogonal projection of the light-shielding pattern 210 on the first substrate 101, a first center line M1 of the signal line 110 coincides with a second center line M2 of a portion 2100, covering the signal line 110, of the light-shielding pattern 210. The first center line M1 and the second center line M2 are both the same as the extending direction of the signal line 110 (as the X direction in FIG. 8). In the plane where the first substrate 101 is located, in the direction (as the Y direction in FIG. 8) perpendicular to the extending direction of the signal line 110, i.e., in the width direction of the signal line 110, the first center line M1 equally divides the signal line 110, so that a distance from the first edge L1 to the first center line M1 is equal to a distance from the second edge L2 to the first center line M1; and the second center line M2 equally divides the portion 2100, covering the signal line 110, of the light-shielding pattern 210, so that a distance from the third edge L3 to the second center line M2 is equal to a distance from the fourth edge L4 to the second center line M2.

In this case, in the direction perpendicular to the extending direction of the at least one signal line 110, i.e., in the width direction of the at least one signal line 110, regions at two opposite sides of the signal line 110 shielded by the light-shielding pattern 210 have the same size. In this way, after the light is reflected by the signal line 110, the reflected light is shielded by the light-shielding pattern 210 in a same degree at the two opposite sides perpendicular to the extending direction of the signal line 110. The difference in the contrast ratios on the two opposite sides of the signal line 110 perpendicular to the extending direction thereof caused by the uneven shielding of the reflected light on the signal line 110 by the light-shielding pattern 210 is avoided, and the display effect of the transparent display apparatus 1 may be prevented from being affected.

Figure 9:
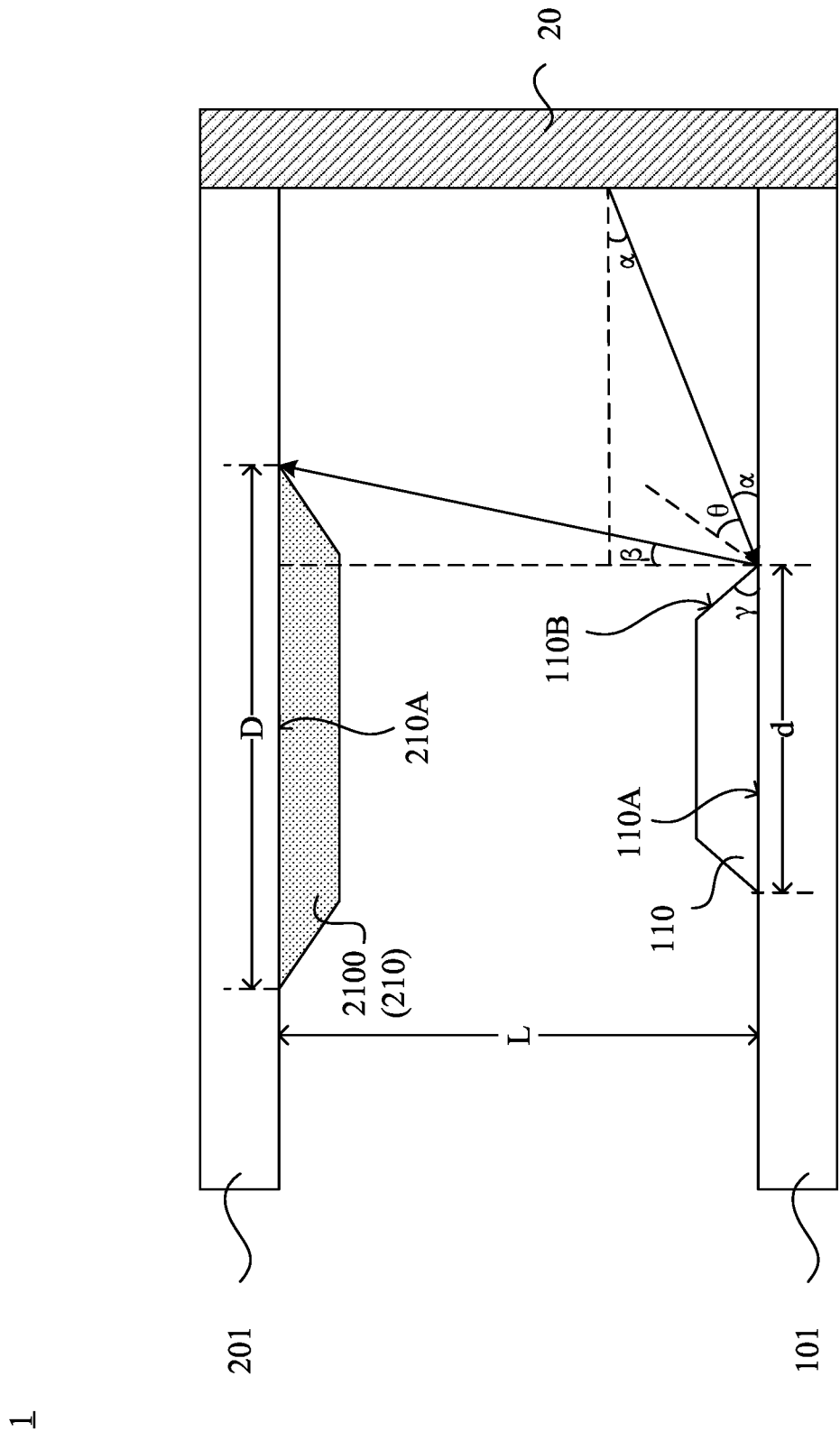
FIG. 9 is a structural diagram of yet another transparent display apparatus, in accordance with some embodiments of the present disclosure.

In some embodiments, referring to FIG. 9, a ratio of a width D of a bottom surface 210A, proximate to the second substrate 201, of the corresponding portion 2100 of the light-shielding pattern 210 to a width d of a bottom surface 100A of the at least one signal line 110 ranges from 1 to 2.5, inclusive. That is, D ranges from d to 2.5d, inclusive, i.e., D=d to 2.5d. For example, D ranges from 1.3d to 2d, inclusive, i.e., D=1.3d to 2d.

In this case, after the light emitted by the light source 20 is reflected by the at least one signal line 110, the reflected light is directed to the second substrate 201, and may be approximately completely shielded by the light-shielding pattern 210, so that the reflected light will not be emitted from the liquid crystal cell 10. Thus, the shielding effect of the light-shielding pattern 210 on the reflected light is improved, and the display effect of the transparent display apparatus 1 is improved.

It will be noted that for convenience of description, FIG. 9 only shows the first substrate 101, the signal line 110, the second substrate 201 and the light-shielding pattern 210, which does not show other film layer structures in the liquid crystal cell 10.

In some embodiments, referring to FIG. 9, a relationship between the width d of the bottom surface 110A of the at least one signal line 110 and the width D of the bottom surface 210A, proximate to the second substrate 201, of the corresponding portion 2100 of the light-shielding pattern 210 is D=2L×tan(2γ+α−90°+d.

Here, L is a distance between the bottom surface 110A of the at least one signal line 110 and the bottom surface 210A, proximate to the second substrate 201, of the corresponding portion of the light-shielding pattern 210; γ is the slope angle provided by the light-reflecting side surface 110B and the bottom surface 110A of the at least one signal line 110; and α is an included angle between the portion of the light incident on the light-reflecting side surface 110B of the at least one signal line 110 and an extend surface of the bottom surface 110A of the signal line 110.

α is greater than or equal to 0 degrees and less than or equal to 60 degrees (0° ≤α≤60°); and γ is greater than or equal to 45 degrees and less than or equal to 80 degrees (45°≤γ≤80°).

In some embodiments, the width D of the bottom surface 210A, proximate to the second substrate 201, of the corresponding portion of the light-shielding pattern 210 is greater than the width d of the bottom surface 110A of the at least one signal line 110. In the width direction of the signal line 110, on one of the two opposite sides of the signal line 110, the distance between the edge of the orthogonal projection of the signal line 110 on the first substrate 101 and the edge of the orthogonal projection of the portion, covering the signal line 110, of the light-shielding pattern 210 on the first substrate 101 is equal to, the distance between the edge of the orthogonal projection of the signal line 110 on the first substrate 101 and the edge of the orthogonal projection of the portion, covering the signal line 110, of the light-shielding pattern 210 on the first substrate 101, on the other of the two opposite sides of the signal line 110. In this case, as shown in FIG. 9, an incident angle of the light emitted by the light source 20 on the light-reflecting side surface 110B is θ, and θ=(90°−α−γ), an included angle between the light reflected by the light-reflecting side surface 110B and the thickness direction of the signal line 110 (i.e., the direction perpendicular to the bottom surface 110A of the signal line 110) is β, and β=(90°−α−2θ), and tan β=(D−d)/(2L). It may be obtained that D=)2L×tan(2γ+α−90°+d.

Therefore, in the actual production process, the width D of the bottom surface 210A, proximate to the second substrate 201, of the portion of the light-shielding pattern 210 whose orthogonal projection on the first substrate 101 overlaps with the orthogonal projection of the signal line 110 on the first substrate 101 may be adjusted according to the distance L between the bottom surface 110A of the signal line 110 and the bottom surface 210A, proximate to the second substrate 201, of the corresponding portion of the light-shielding pattern 210, the slope angle γ provided by the light-reflecting side surface 110B and the bottom surface 110A of the signal line 110, the included angle α between the portion of the light incident on the light-reflecting side surface 110B of the signal line 110 and the extend surface of the bottom surface 110A of the signal line 110, and the width d of the bottom surface 110A of the signal line 110, so as to ensure that the light reflected by the signal line 110 may be effectively shielded by the light-shielding pattern 210.

It will be noted that, the width D of the bottom surface 210A, proximate to the second substrate 201, of the corresponding portion of the light-shielding pattern 210 (the portion of the light-shielding pattern 210 whose orthogonal projection on the first substrate 101 overlaps with the orthogonal projection of the signal line 110 on the first substrate 101) is related to: the distance between the bottom surface 110A of the signal line 110 and the bottom surface 210A, proximate to the second substrate 201, of the portion of the light-shielding pattern 210 corresponding to the signal line 110; the slope angle provided by the light-reflecting side surface 110B and the bottom surface 110A of the signal line 110; the included angle between the light incident on the light-reflecting side surface 110B of the signal line 110 and the extend surface of the bottom surface 110A of the signal line 110; and the width of the bottom surface 110A of the signal line 110, not related to a slope angle of the light-shielding pattern 210 (i.e., the included angle between an inclined side surface and the bottom surface of the light-shielding pattern 210).

For example, a thickness of the light-shielding pattern 210 ranges from 0.8 μm to 2 μm, inclusive. For example, the thickness of the light-shielding pattern 210 may be 1.1 μm, 1.5 μm or 1.8 μm. In this case, it may be avoided that the thickness of the transparent display apparatus 1 is too large due to the too large thickness of the light-shielding pattern 210, which may facilitate a realization of the transparent display apparatus 1 to be light and thin.

Figure 10:
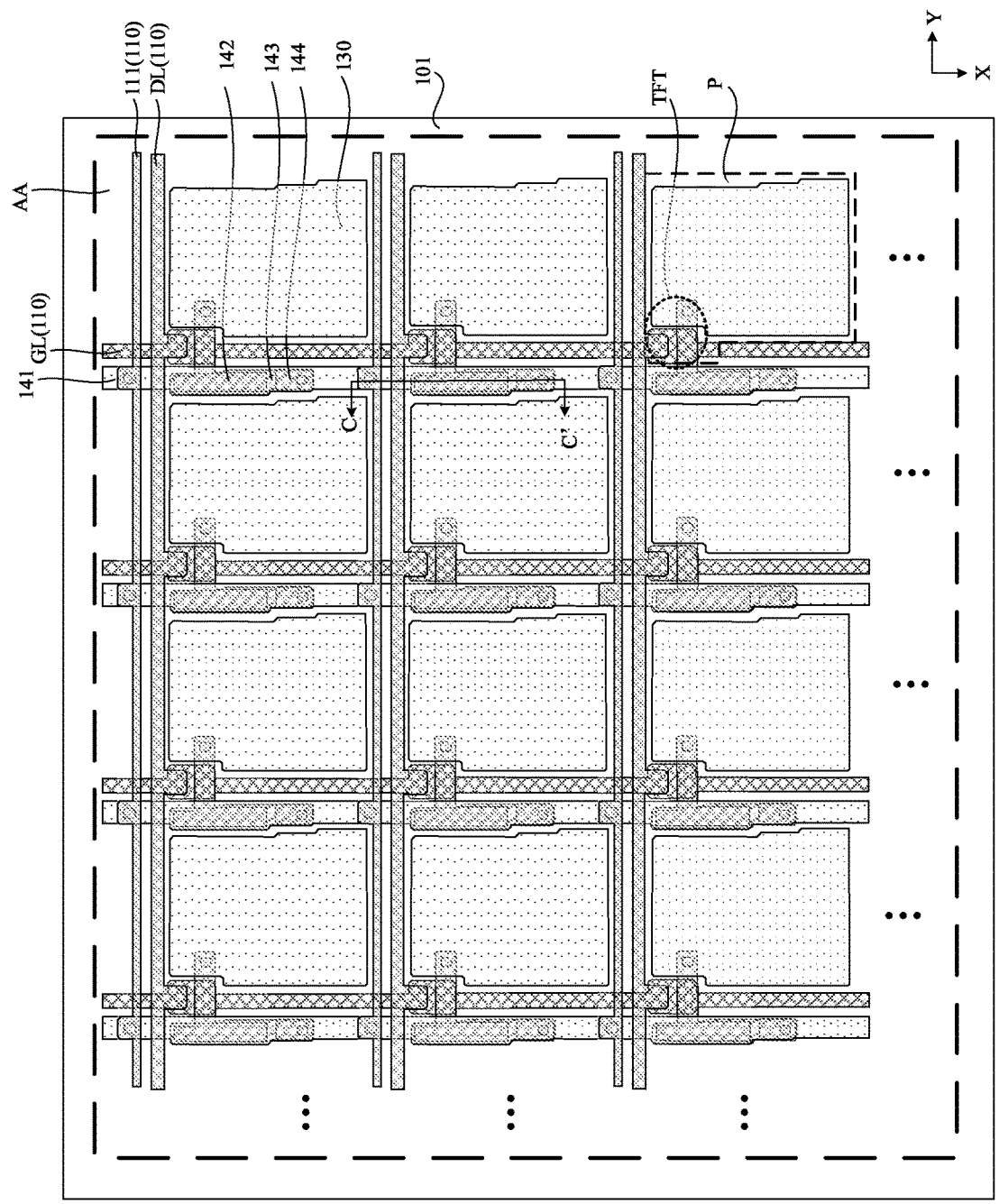
FIG. 10 is a structural diagram of a liquid crystal cell, in accordance with some embodiments of the present disclosure.

In some embodiments, as shown in FIG. 10, the AA region includes a plurality of pixel regions P. The liquid crystal cell 10 further includes a thin film transistor (TFT) disposed on the first substrate 101 and located in each pixel region P.

It will be noted that a manner in which the plurality of pixel regions P are arranged may be set according to actual conditions, which is not limited in the present disclosure. For example, as show in FIG. 10, the plurality of pixel region P are arranged in an array, and pixel regions P arranged in a line in the X direction are referred to as pixel regions in a same row, and pixel regions P arranged in a line in the Y direction are referred to as pixel regions in a same column.

Figure 12A:
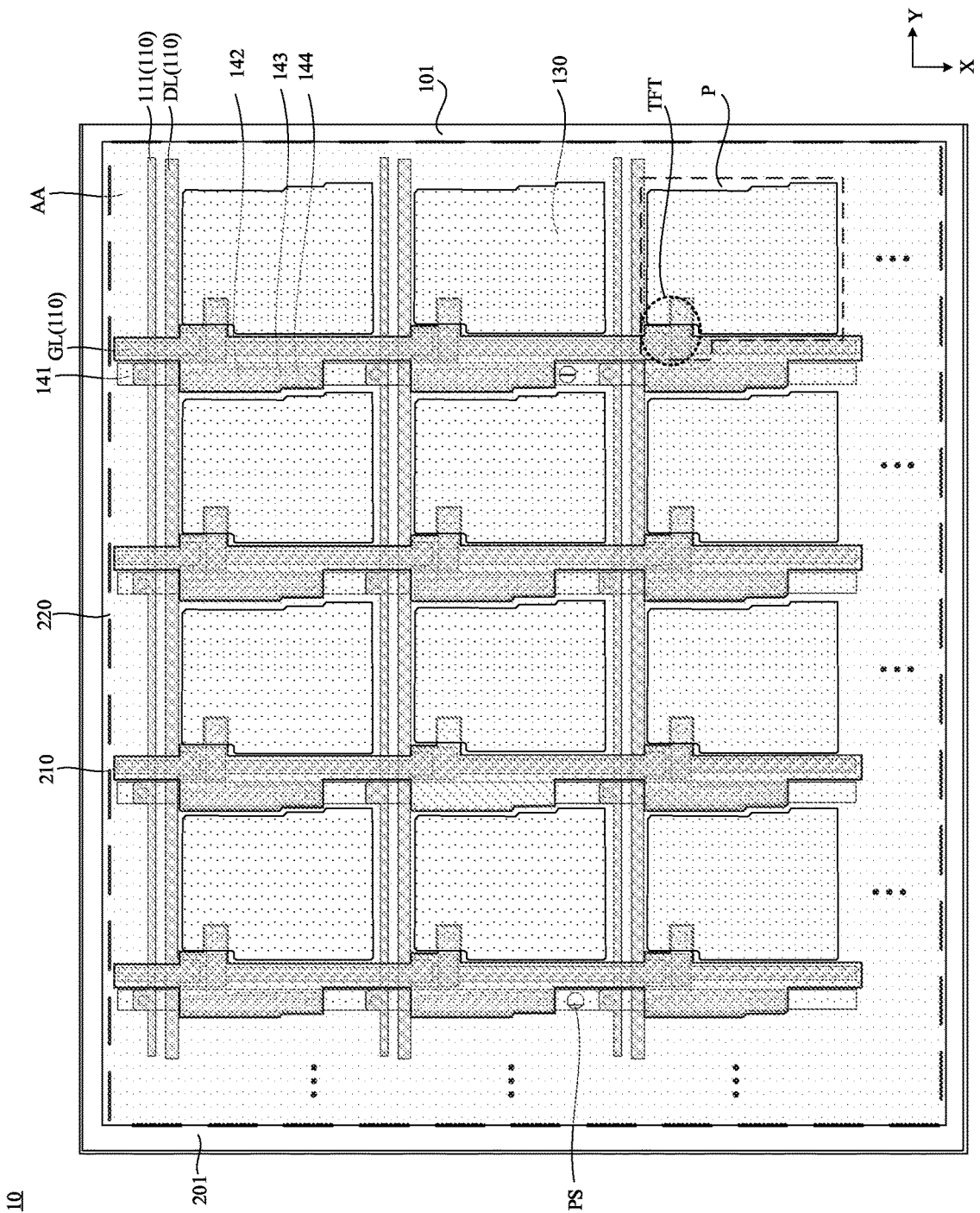
FIG. 12A is a structural diagram of another liquid crystal cell, in accordance with some embodiments of the present disclosure.
Figure 12B:
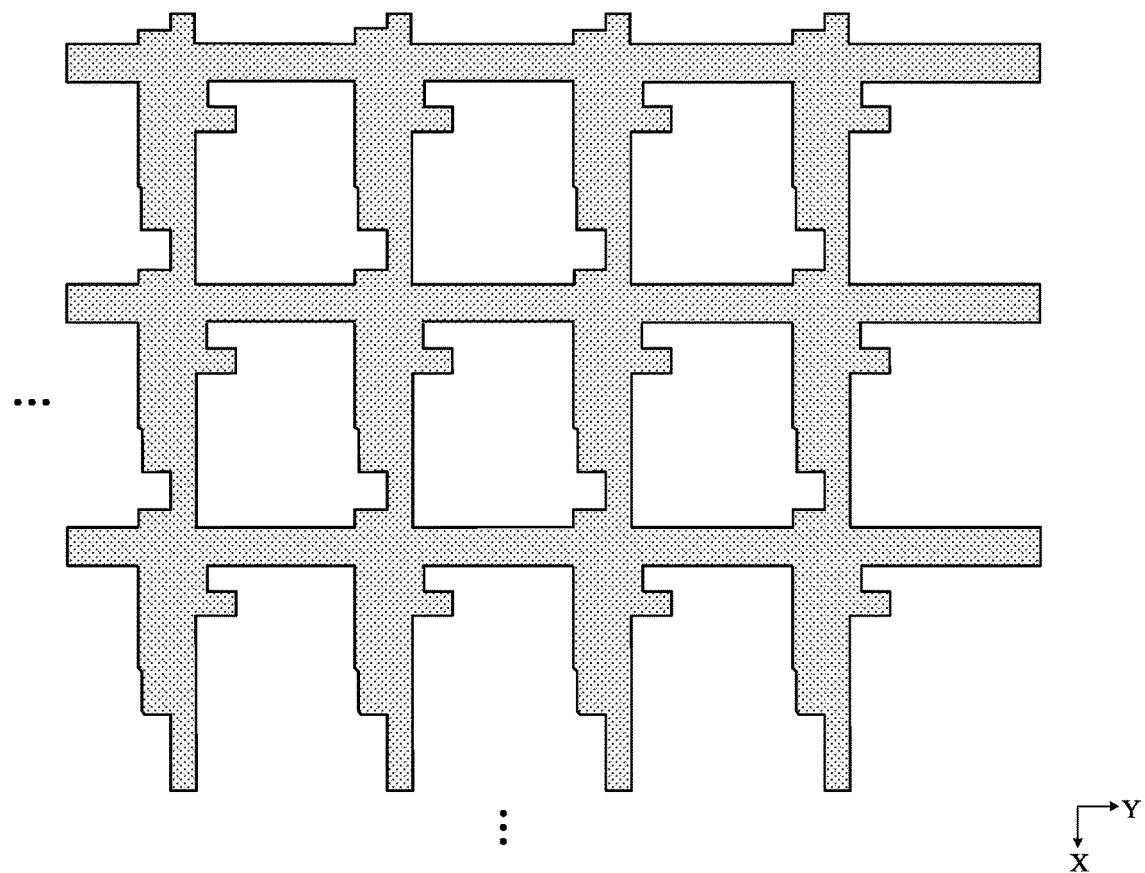
FIG. 12B is a top view of a light-shielding pattern, in accordance with some embodiments of the present disclosure.
Figure 13:
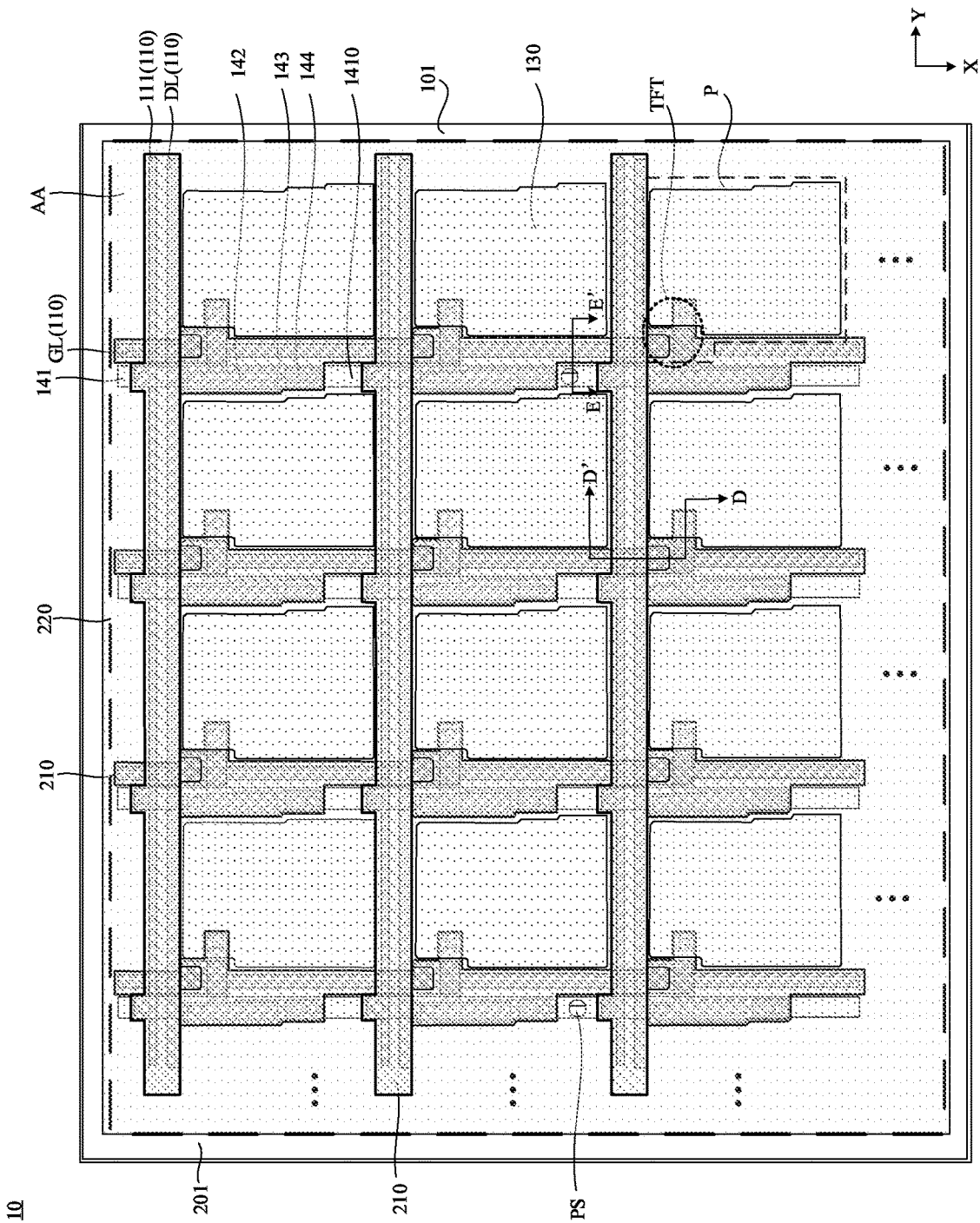
FIG. 13 is a structural diagram of yet another liquid crystal cell, in accordance with some embodiments of the present disclosure.
Figure 14:
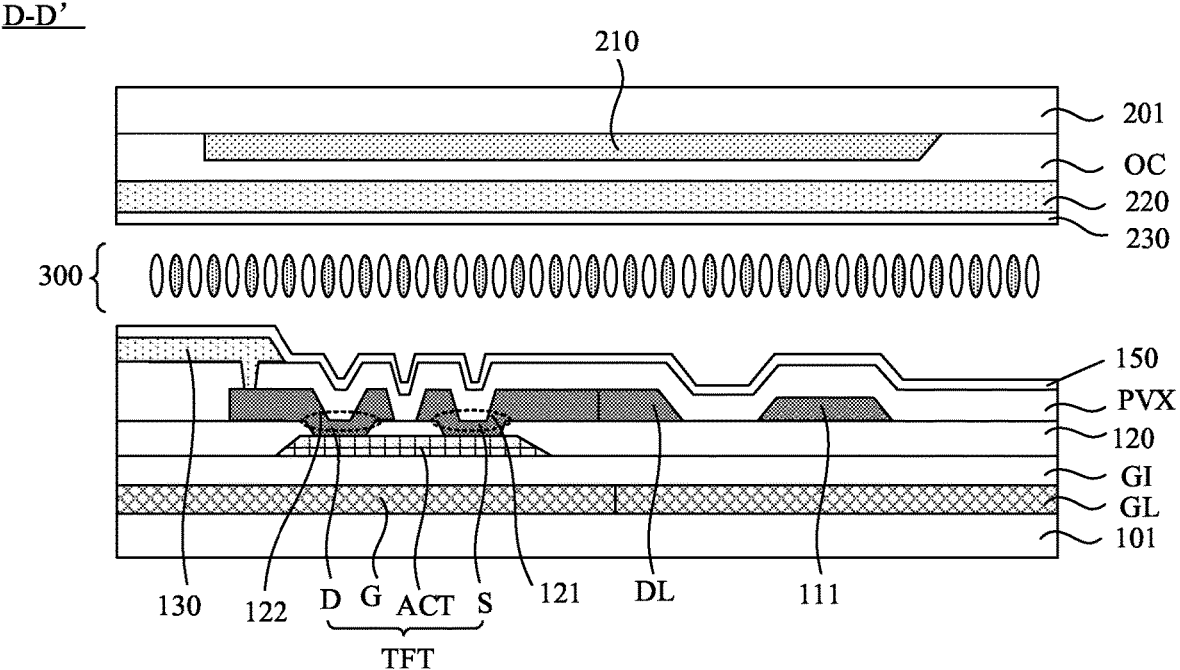
FIG. 14 is a sectional view of the liquid crystal cell in FIG. 13 taken along the line D-D'.

In some embodiments, as shown in FIGS. 12, 13 and 14, an orthogonal projection of the TFT on the first substrate 101 is within the orthogonal projection of the light-shielding pattern 210 on the first substrate 101.

It may be understood that as shown in FIG. 14, the TFT includes a gate G, an active layer ACT, a source S and a drain D. The liquid crystal cell 10 further includes a gate insulating layer GI disposed between the gate G and the active layer ACT. For example, referring to FIG. 14, the gate G is located on a side of the active layer ACT proximate to the first substrate 101, and the source S and the drain D are located on a side of the active layer ACT away from the first substrate 101. In this case, the TFT is a bottom-gate TFT. For example, the materials of the gate G, the source S and the drain D include metals. The gate G, the source S and the drain D are all reflective.

In this case, the light emitted by the light source 20 irradiates the TFT, for example, irradiates at least one of the gate G, the source S and the drain D, and will be reflected, and the reflected light will be directed to the second substrate 201. In this case, the orthogonal projection of the TFT on the first substrate 101 is within the orthogonal projection of the light-shielding pattern 210 on the first substrate 101, so that the light reflected by the TFT and directed to the second substrate 201 may be shielded, so as to prevent the reflected light from emitting from the liquid crystal cell 10 and affecting the viewing effect of the user, thereby improving the display effect of the transparent display apparatus 1.

In some embodiments, as shown in FIG. 10, the plurality of signal lines 110 includes gate lines GL and data lines DL. An extending direction of the gate lines GL (e.g., the X direction in FIG. 10) intersects the extending direction of the data lines DL (e.g., the Y direction in FIG. 10).

The TFT is coupled to a gate line GL and a data line DL. For example, in a case where the plurality of pixel regions P are arranged in the array, a gate line GL is located between two adjacent rows of pixel regions, and TFTs in a single row of pixel regions P are coupled to the gate line GL; a data line DL is located between two adjacent columns of pixel regions, and TFTs in a single column of pixel regions P are coupled to the data line DL.

The materials of the gate line GL and the gate G of the TFT are the same, and the gate line GL and the gate G of the TFT are disposed in a same layer, and may be formed simultaneously in a process (e.g., formed by patterning a same film layer), thereby saving the process. The gate line GL is coupled to the gate G of the TFT. For example, a portion of the gate line GL may serve as the gate G of the TFT. The materials of the data line DL, the source S and the drain D of the TFT are the same, and the data line DL, the source S and the drain D of the TFT are disposed in a same layer, and may be formed simultaneously in a process, thereby saving the process. The data line DL is coupled to the source S of the TFT. For example, a portion of the data line DL may serve as the source S.

As shown in FIG. 13, orthogonal projections of the gate lines GL and the data lines DL on the first substrate 101 are all within the orthogonal projection of the light-shielding pattern 210 on the first substrate 101. It may be understood that, the light emitted by the light source 20 irradiates the gate lines GL and the data lines DL, and then is reflected thereon. The reflected light is directed to the second substrate 201. The light-shielding pattern 210 may shield the light reflected by the gate lines GL and the data lines DL to prevent the reflected light from emitting from the liquid crystal cell 10.

For another example, as shown in FIG. 12A, orthogonal projections of the gate lines GL or the data lines DL on the first substrate 101 are within the orthogonal projection of the light-shielding pattern 210 on the first substrate 101. In this case, an extending direction of the orthogonal projections of the gate lines GL or the data lines DL on the first substrate 101, which are within the orthogonal projection of the light-shielding pattern 210 on the first substrate 101, and the normal direction of the side surface, disposed opposite to the light source 20, of the liquid crystal cell 10 are perpendicular to each other, or intersect at an acute angle. In this way, the problem of affecting the transmittance of the transparent display apparatus 1 due to the low transmittance of the light-shielding pattern 210 to the light may be avoided.

For example, in a case where the orthogonal projections of the gate lines GL on the first substrate 101 are within the orthogonal projection of the light-shielding pattern 210 on the first substrate 101, in the process of forming the light-shielding pattern 210, a mask for forming the gate lines GL may be used to pattern a light-shielding film in which the light-shielding pattern is to be formed. In a case where the orthogonal projections of the data lines DL on the first substrate 101 are within the orthogonal projection of the light-shielding pattern 210 on the first substrate 101, in the process of forming the light-shielding pattern 210, a mask for forming the data lines DL may be used to pattern the light-shielding film in which the light-shielding pattern is to be formed.

In some embodiments, as shown in FIG. 14, the liquid crystal cell 10 further includes a barrier layer 120 disposed on the first substrate 101. The barrier layer 120 is located between a pattern layer where the active layer ACT is located and a pattern layer where the source S and the drain D are located.

The barrier layer 120 is provided with first via holes 121 and second via holes 122 therein. The first via holes 121 and the second via holes 122 go through the barrier layer 120. The source S is coupled to the active layer ACT through a first via hole 121, and the drain D is coupled to the active layer ACT through a second via hole 122.

It will be noted that the barrier layer 120 covers at least a channel region of the TFT. The channel region of the TFT refers to a region in the active layer ACT between the source S and the drain D of the TFT that can form a conductive channel under the action of an applied voltage. In this case, in the aspect of process, the barrier layer 120 may protect the active layer ACT to avoid the influence of the subsequent film layer manufacturing process, for example, the influence of an etching solution used in the patterning of the source S and the drain D on the active layer ACT, so as to improve the stability of the active layer ACT.

Figure 11A:
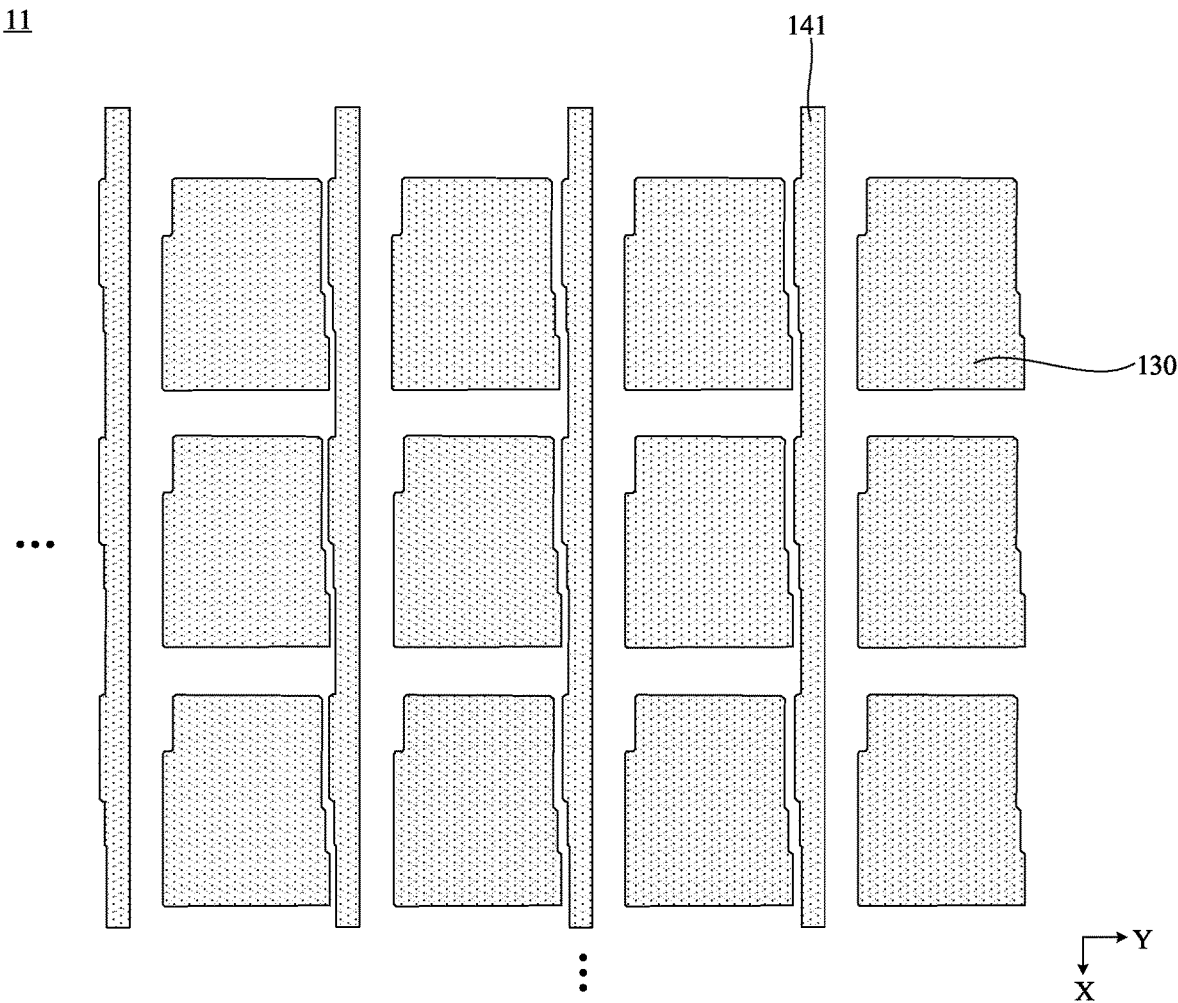
FIG. 11A is a top view of a first pattern layer, in accordance with some embodiments of the present disclosure.
Figure 11B:
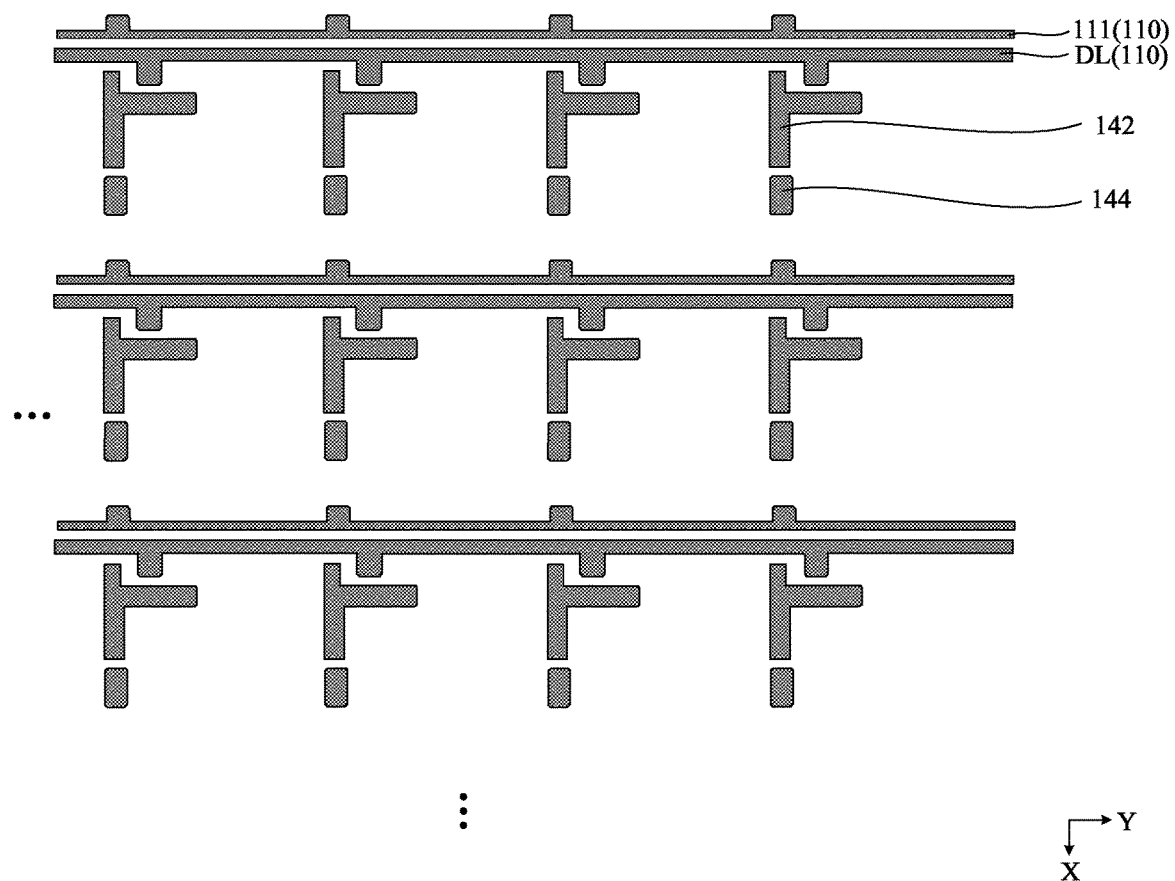
FIG. 11B is a top view of a second pattern layer, in accordance with some embodiments of the present disclosure.

In some embodiments, as shown in FIGS. 10 and 11B, the plurality of signal lines 110 further include power lines 111. It may be understood that in a case where the second electrode 220 is a common electrode, the power lines 111 are coupled to the second electrode 220. For example, the power lines 111 are configured to transmit a common electrical signal.

The power lines 111 extend in a same direction as the data lines DL, e.g., both in the Y direction in FIG. 10. The materials of the power lines 111 and the data lines DL are the same, and the power lines 111 and the data lines DL are disposed in a same layer, and may be formed simultaneously in a process, thereby saving the process. The power lines 111 and the data lines DL are disposed at intervals, and the power lines 111 and the data lines DL are insulated from each other, so as to avoid affecting the respective signal transmissions of the power lines 111 and the data lines DL.

For example, in the case where the plurality of pixel regions P are disposed in the array, a power line 111 may be located between two adjacent columns of pixel regions. In addition, in a case where the power line 111 and a data line DL are disposed between the two adjacent columns of pixel regions, the power line 111 is farther from the TFT to which the data line DL is coupled than the data line DL.

For example, orthogonal projections of the power lines 111 on the first substrate 101 are within the orthogonal projection of the light-shielding pattern 210 on the first substrate 101, so that the light reflected by the power lines 111 may be prevented from emitting from the liquid crystal cell 10.

In some embodiments, as shown in FIG. 10, the first electrodes 130 are located on the first substrate 101, and each pixel region P is provided with a first electrode 130 therein. That is, a first electrode 130 is disposed in a pixel region P, and the TFT is closer to the first substrate 101 than the first electrode 130. In the pixel region P, the drain D of the TFT is coupled to the first electrode 130 (i.e., the pixel electrode).

As shown in FIG. 14, the liquid crystal cell 10 further includes a passivation layer PVX disposed on the side of the source S and the drain D of the TFT away from the first substrate 101. In addition, in a case where the first electrode 130 is a pixel electrode, the passivation layer PVX is located between the first electrode 130 and the source S and the drain D of the TFT. In this case, the first electrode 130 may be coupled to the drain D of the TFT through a via hole disposed in the passivation layer PVX.

In some embodiments, as shown in FIGS. 10 and 11A to 11D, the liquid crystal cell 10 further includes first conductive patterns 141, second conductive patterns 142 and third conductive patterns 143.

The materials of the first conductive patterns 141 and the first electrodes 130 are the same, and the first conductive patterns 141 and the first electrodes 130 are disposed in a same layer, and may be formed simultaneously in a process, thereby saving the process. For example, the liquid crystal cell 10 includes a first pattern layer. As shown in FIG. 11A, the first pattern layer 11 includes the first conductive patterns 141 and the first electrodes 130. In addition, since the first conductive patterns 141 are transparent, the light emitted by the light source 20 will not be reflected by the first conductive pattern 141 when irradiates thereon. Therefore, the orthogonal projection of the light-shielding pattern 210 on the first substrate 101 will not overlap with orthogonal projections of the first conductive patterns 141 on the first substrate 101, and the transparency and the aperture ratio of the transparent display apparatus 1 may be improved.

For example, a first conductive pattern 141 is located between two adjacent rows of pixel regions, and also located between two adjacent first electrodes 130. In addition, between the two adjacent rows of pixel regions, the first conductive pattern 141 is farther from the TFT to which a gate line GL is coupled than the gate line GL.

The first conductive pattern 141 is coupled to the power line 111. For example, the first conductive pattern 141 and the power line 111 intersects to each other, and the first conductive pattern 141 and the power line 111 are coupled through a via hole through the passivation layer PVX located therebetween.

For example, extending direction of the first conductive patterns 141 is the same as the extending direction of the gate lines GL. The orthogonal projection of the first conductive pattern 141 on the first substrate 101 is in a strip shape. Two adjacent first conductive patterns 141 may be coupled to form an integrated structure. In this way, a voltage drop of each first conductive pattern 141 may be reduced, thereby improving a uniformity of a potential of each first conductive pattern 141.

The materials of the second conductive patterns 142 and the data lines DL are the same, and the second conductive patterns 142 and the data lines DL are disposed in a same layer, and may be formed simultaneously in a process, thereby saving the process. For example, the liquid crystal cell further includes a second pattern layer, which is closer to the first substrate than the first pattern layer. As shown in FIG. 11B, the second pattern layer 12 includes the second conductive patterns 142 and the data lines DL. The second conductive pattern 142 is coupled to the drain D of the TFT. Since the drain D of the TFT is coupled to the first electrode 130, the second conductive pattern 142 is coupled to the first electrode 130.

For example, in the column direction in which the pixel regions P are arranged (e.g., the Y direction in FIG. 10), an orthogonal projection of a second conductive pattern 142 on the first substrate 101 is located between orthogonal projections of two adjacent first electrodes 130 on the first substrate 101. The second conductive pattern 142 is farther from the TFT to which a gate line GL is coupled than the gate line GL. A portion of the second conductive pattern 142 may extend into the TFT to serve as the drain D. In this case, the second conductive pattern 142 and the drain D are in an integrated structure.

Figure 11C:
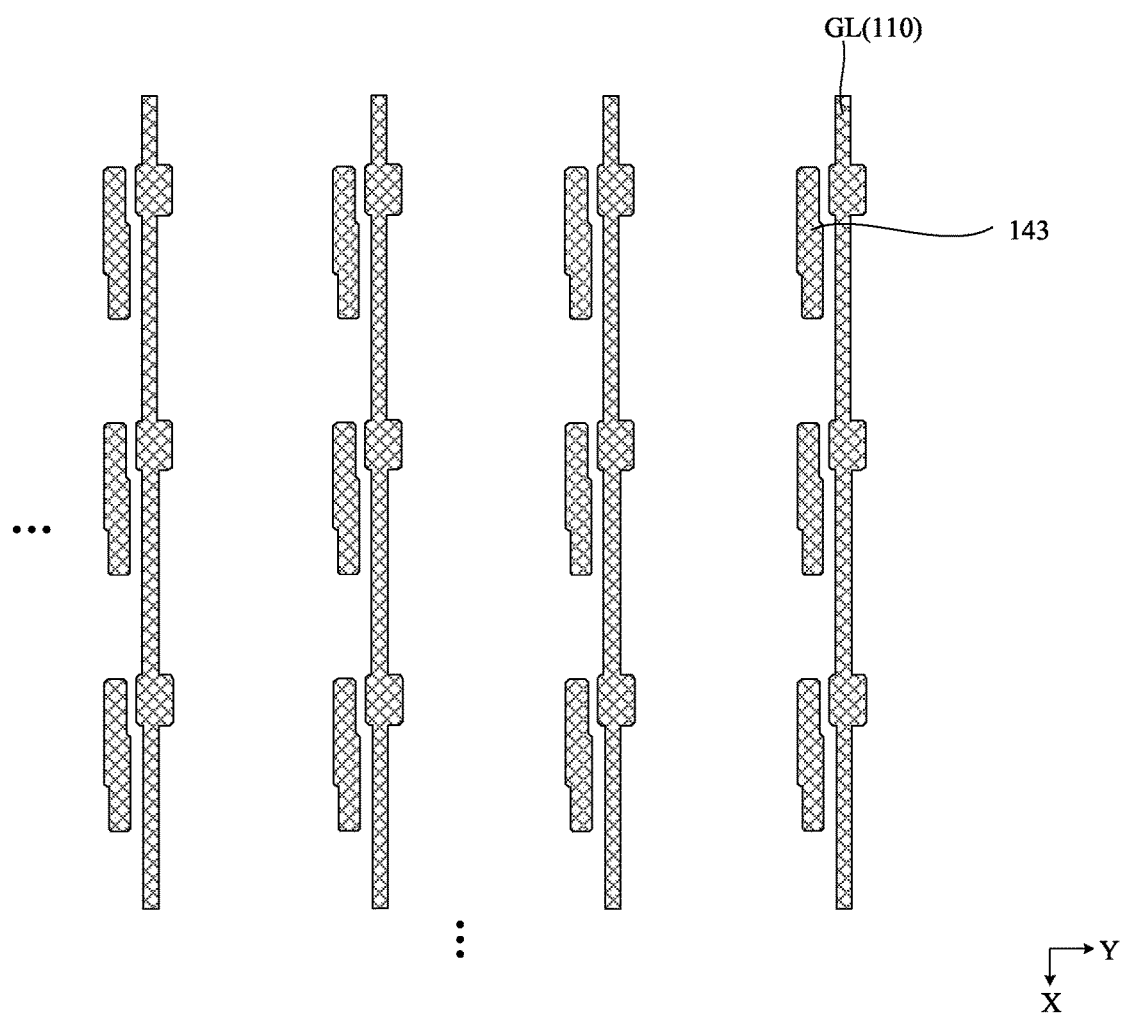
FIG. 11C is a top view of a third pattern layer, in accordance with some embodiments of the present disclosure.
Figure 11D:
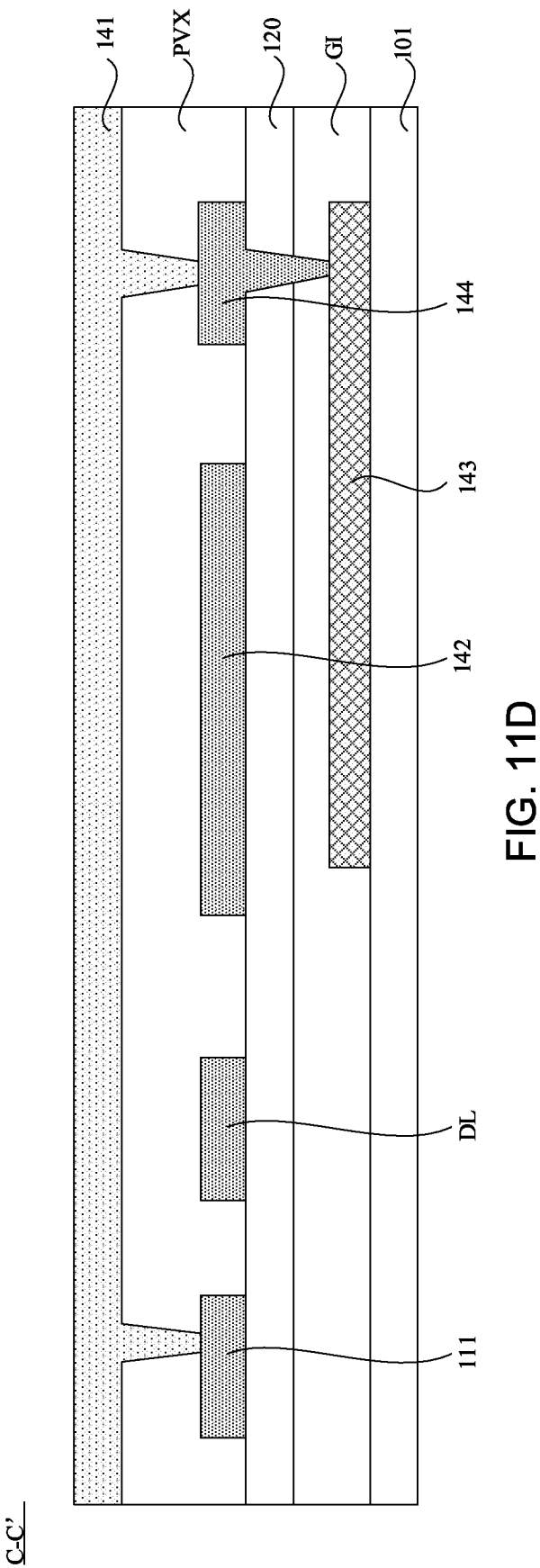
FIG. 11D is a sectional view of the liquid crystal cell in FIG. 10 taken along the line C-C'.

The materials of the third conductive patterns 143 and the gate lines GL are the same, and the third conductive patterns 143 and the gate lines GL are disposed in a same layer, and may be formed simultaneously in a process, thereby saving the process. For example, the liquid crystal cell further includes a third pattern layer, which is closer to the first substrate than the second pattern layer. As shown in FIG. 11C, the third pattern layer 13 includes the third conductive patterns 143 and the gate lines GL. In the column direction in which the pixel regions P are arranged (e.g., the Y direction in FIG. 10), third conductive patterns 143 are located between two adjacent rows of pixel regions, and an orthogonal projection of a third conductive pattern 143 on the first substrate 101 is located between orthogonal projections of two adjacent first electrodes 130 on the first substrate 101. The third conductive pattern 143 is farther from the TFT to which a gate line GL is coupled than the gate line GL. The third conductive pattern 143 is coupled to the first conductive pattern 141. Since the first conductive pattern 141 is coupled to the power line 111, the third conductive pattern 143 is coupled to the power line 111.

An orthogonal projection of the third conductive pattern 143 on the first substrate 101 overlaps with an orthogonal projection of the second conductive pattern 142 on the first substrate 101. In this case, the third conductive pattern 143 and the second conductive pattern 142 and the film layers therebetween (e.g., the gate insulating layer GI and the barrier layer 120) may form a storage capacitor to store a voltage on the data line DL.

In addition, the orthogonal projection of the second conductive pattern 142 on the first substrate 101 overlaps with the orthogonal projection of the first conductive pattern 141 on the first substrate 101, so that the second conductive pattern 142 and the first conductive pattern 141 and the film layers therebetween may also form a storage capacitor to store the voltage on the data line DL. Moreover, since the thickness of the film layer (e.g., the passivation layer PVX) between the second conductive pattern 142 and the first conductive pattern 141 is large, that is, the second conductive pattern 142 is far away from the first conductive pattern 141, a capacitance of the storage capacitor formed by the second conductive pattern 142 and the first conductive pattern 141 is less than a capacitance of the storage capacitor formed by the third conductive pattern 143 and the second conductive pattern 142.

For example, as shown in FIGS. 10 and 11C, the liquid crystal cell 10 further includes fourth conductive patterns 144, and the fourth conductive patterns 144 and the second conductive patterns 142 are disposed in a same layer and made of a same material. For example, the second conductive layer 12 further includes the fourth conductive patterns 144. In the column direction in which the pixel regions P are arranged, a fourth conductive pattern 144 is located between two adjacent rows of pixel regions and also between two adjacent first electrodes 130. The fourth conductive pattern 144 is farther from the TFT to which a gate line GL is coupled than the gate line GL. In the row direction in which the pixel regions P are arranged (e.g., the X direction in FIG. 10), the fourth conductive pattern 144 is farther from the data line DL than the second conductive pattern 142. An orthogonal projection of the fourth conductive pattern 144 on the first substrate 101 is non-overlapping with the orthogonal projection of the second conductive pattern 142 on the first substrate 101, and overlaps with both the orthogonal projection of the first conductive pattern 141 and the orthogonal projection of the third conductive pattern 143 on the first substrate 101. In this case, the first conductive pattern 141 and the fourth conductive pattern 144 are coupled through a via hole through the passivation layer PVX therebetween, and the fourth conductive pattern 144 and the third conductive pattern 143 are coupled through a via hole through the gate insulating layer GI and the barrier layer 120 therebetween, so as to couple the first conductive pattern 141 and the third conductive pattern 143.

In some embodiments, as shown in FIG. 12A, orthogonal projections of the second conductive patterns 142 on the first substrate 101 and orthogonal projections of the third conductive patterns 143 on the first substrate 101 are within the orthogonal projection of the light-shielding pattern 210 on the first substrate 101. In this case, the light-shielding pattern 210 may shield the of light reflected by the second conductive patterns 142 and the third conductive patterns 143 to prevent the reflected light from emitting from the liquid crystal cell 10. Since the first conductive patterns 141 are transparent, the light-shielding pattern 210 does not need to shield them, so that the transmittance of the transparent display apparatus 1 may be improved.

Figure 15:
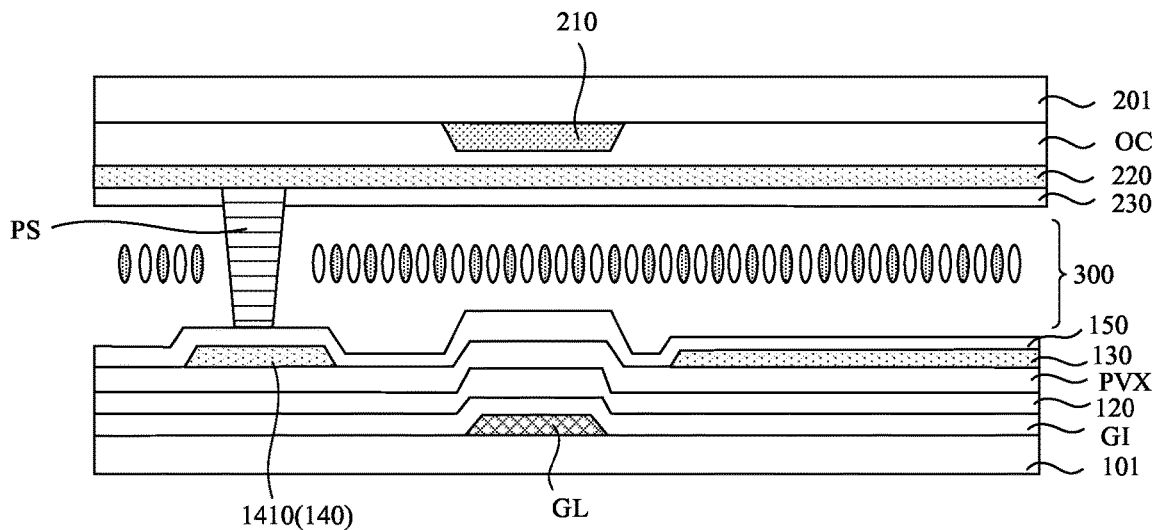
FIG. 15 is a sectional view of the liquid crystal cell in FIG. 13 taken along the line E-E'.

For example, the first conductive patterns 141 extend in a same direction as the gate lines GL. As shown in FIGS. 13 and 15, the first conductive pattern 141 includes unshielded portions 1410. The unshielded portion 1410 is located between two adjacent first electrodes 130. An orthogonal projection of the unshielded portion 1410 is non-overlapping with the orthogonal projections of the second conductive pattern 142 and the third conductive pattern 143 on the first substrate 101, and an orthogonal projection of the unshielded portion 1410 on the second substrate 201 is non-overlapping with an orthogonal projection of the light-shielding pattern 210 on the second substrate 201. In this way, the aperture ratio and the transmittance of the transparent display apparatus 1 may be improved.

For example, in a case where the orthogonal projections of the gate lines GL, the data lines DL, the TFTs, the second conductive patterns 142 and the third conductive patterns 143 are within the orthogonal projection of the light-shielding pattern 210 on the first substrate 101, a top view of the light-shielding pattern 210 is shown in FIG. 12B. Widths (such as dimensions in the Y direction) of portions of the light-shielding pattern 210 extending in the X direction (such as the extending direction of the gate lines) are not completely equal, for example, widths of some is large, and widths of some is small. For example, widths of portions of the light-shielding pattern 210 that covers the second conductive patterns 142 and the third conductive patterns 143 are large, and widths of portions of the light-shielding pattern 210 that only covers the gate lines GL are small.

In addition, in a case where the liquid crystal cell 10 further includes the fourth conductive patterns 144, orthogonal projections of the fourth conductive patterns 144 are within the orthogonal projection of the light-shielding pattern 210 on the first substrate 101. In this way, the problem of the light reflected at the fourth conductive patterns 144 emitting from the liquid crystal cell 10 may be avoided.

In some embodiments, as shown in FIGS. 13, 14 and 15, the second electrode 220 is located on the second substrate 201, and is closer to the first substrate 101 than the light-shielding pattern 210.

For example, the power lines 111 may be coupled to the second electrode 220 through a conductive adhesive formed on the second substrate 201. For example, the conductive adhesive may be gold ball glue. A thickness of the second electrode 220 is about 700 angstrom (A).

It will be noted that the transparent display apparatus 1 further includes an external circuit bonded to the liquid crystal cell 10, the power lines 111 are coupled to the external circuit, and the external circuit transmits the common electrical signal to the second electrode 220 through the power lines 111.

In some embodiments, as shown in FIG. 13, the entire AA region is within an orthogonal projection of the second electrode 220 on the second substrate 201. For example, in the aspect of process, a material to be formed into the second electrode 220 may be deposited on the second substrate 201 on the side of the light-shielding pattern 210 proximate to the first substrate 101, thereby simplifying the production process.

Figure 16:
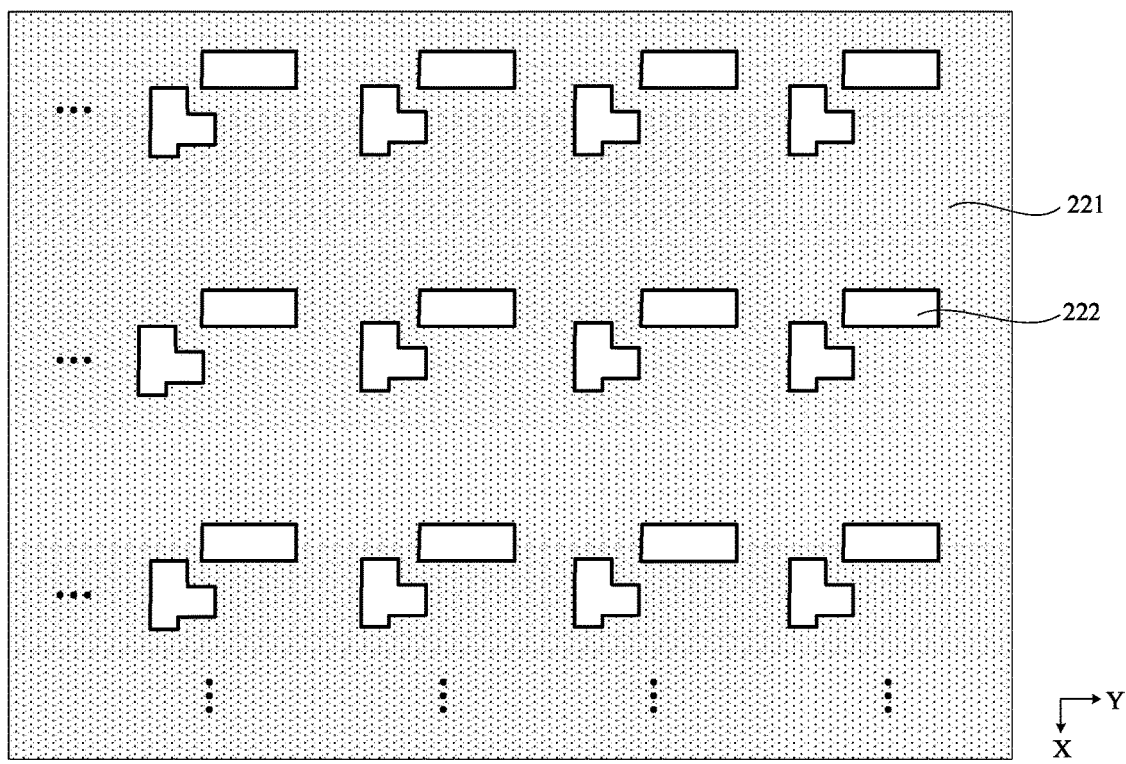
FIG. 16 is a structural diagram of a second electrode, in accordance with some embodiments of the present disclosure.

In some other embodiments, as shown in FIG. 16, the second electrode 220 includes: a second electrode body 221 and a plurality of openings 222 disposed in the second electrode body 221.

It may be understood that in the thickness direction of the liquid crystal cell 10, the plurality of openings 222 go through the common electrode body 221. A material of the common electrode body 221 is a transparent conductive material, such as ITO.

Figure 17:
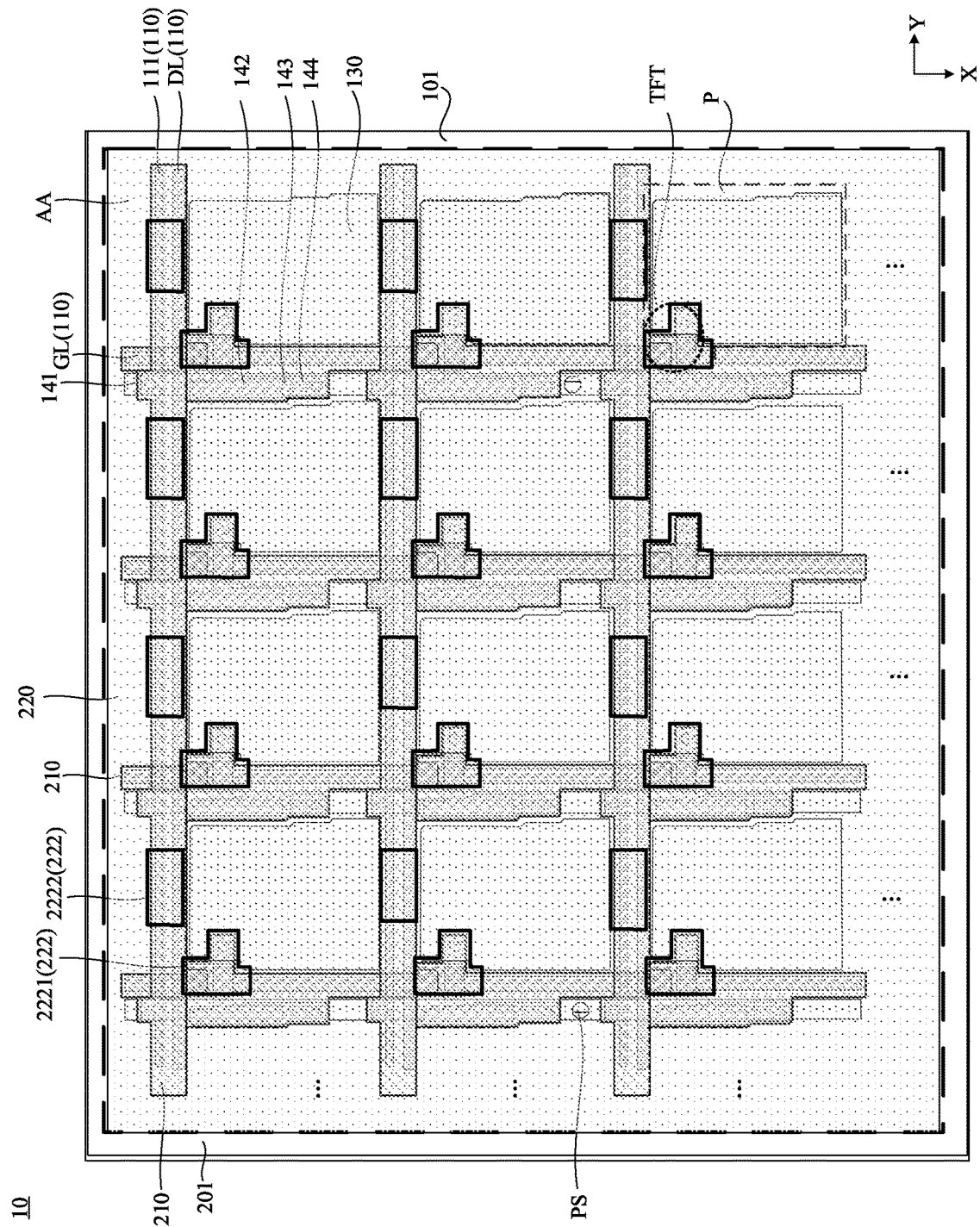
FIG. 17 is a structural diagram of yet another liquid crystal cell, in accordance with some embodiments of the present disclosure.
Figure 18:
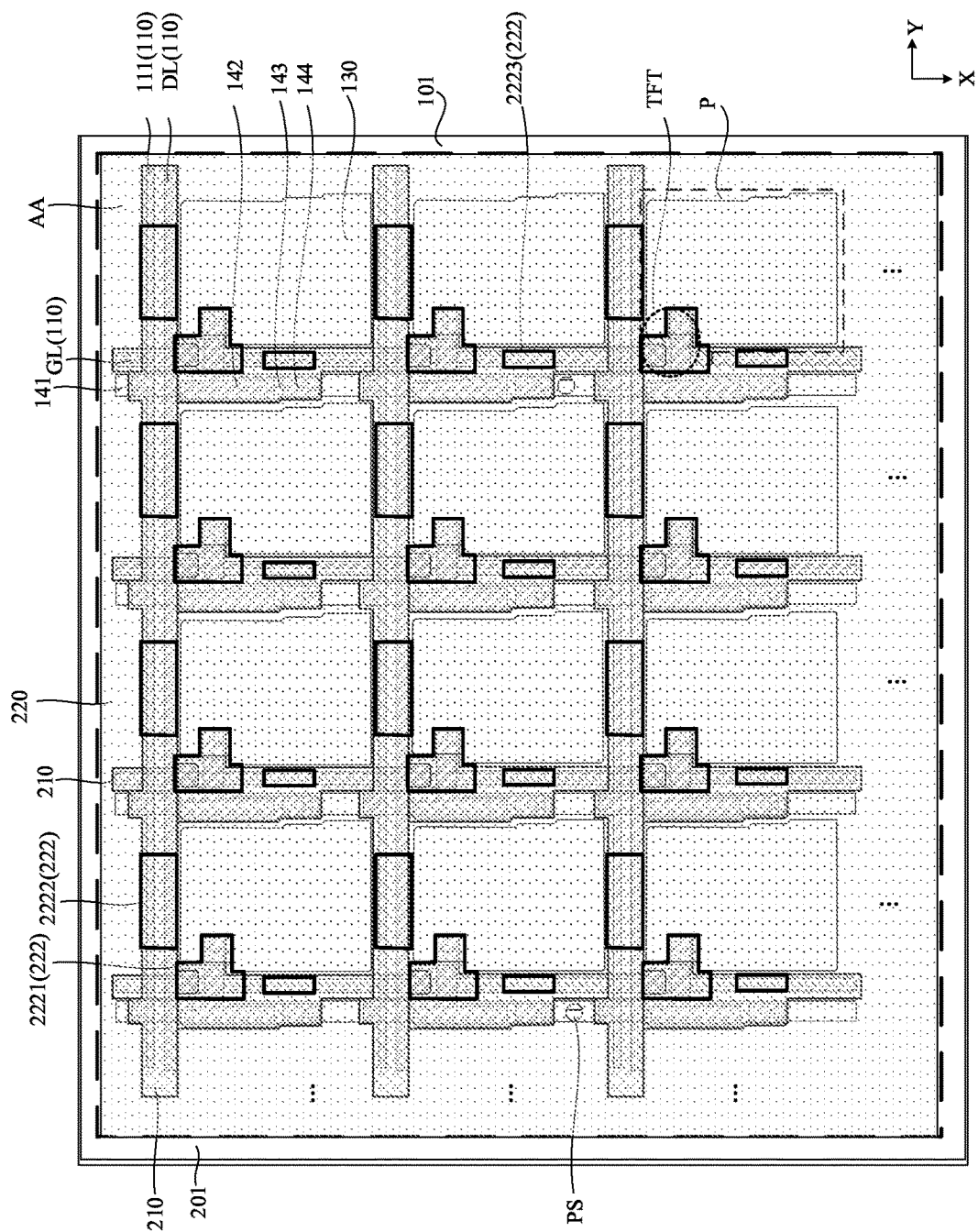
FIG. 18 is a structural diagram of yet another liquid crystal cell, in accordance with some embodiments of the present disclosure.

As shown in FIGS. 17 and 18, the plurality of openings 222 include at least one type of first openings 2221, second openings 2222 and third openings 2223. An orthogonal projection of the first opening 2221 on the first substrate 101 coincides or substantially coincides with an orthogonal projection of a TFT on the first substrate 101. An orthogonal projection of the second opening 2222 on the first substrate 101 overlaps with an orthogonal projection of a data line DL on the first substrate 101. An orthogonal projection of the third opening 2223 on the first substrate 101 overlaps with an orthogonal projection of a gate line GL on the first substrate 101.

For example, in a case where the plurality of signal lines 110 include the power lines 111, the orthogonal projection of the second opening 2222 on the first substrate 101 overlaps with an orthogonal projection of a power line 111 on the first substrate 101.

It will be noted that the specific arrangement and sizes of the first openings 2221, the second openings 2222 and the third openings 2223 may be designed according to actual conditions, which are not limited in the embodiments of the present disclosure. For example, in the case where the plurality of pixel regions P are arranged in the array, the orthogonal projection of the second opening 2222 on the first substrate 101 is located between two adjacent pixel regions in a column of pixel regions. In the extending direction of the data line DL, orthogonal projections of first openings 2221 on the first substrate 101 and orthogonal projections of second openings 2222 on the first substrate 101 may be arranged alternately and at intervals. For example, in the extending direction of the data line DL, a length of the second opening 2222 is approximately equal to half of a length of a portion of the data line DL located between two adjacent gate lines GL. In the extending direction of the gate line GL, the orthogonal projections of the first openings 2221 on the first substrate 101 and orthogonal projections of third openings 2223 on the first substrate 101 may be arranged alternately and at intervals.

In a case where the signal lines 110 whose orthogonal projections on the first substrate 101 are within the orthogonal projection of the light-shielding pattern 210 on the first substrate 101 further include the power supply lines 111, the orthogonal projection of the second opening 2222 on the first substrate 101 overlaps with an orthogonal projection of a power line 111 on the first substrate 101.

In this case, since each opening contained in the second electrode 220 may reduce the size of an region where the orthogonal projection of the second electrode 220 on the first substrate 101 overlaps with an orthogonal projection of a conductive structure (e.g., each signal line 110) in the liquid crystal cell 10 on the first substrate 101, a parasitic capacitance due to the overlap of the orthogonal projection of the second electrode 220 on the first substrate 101 and the orthogonal projection of the conductive structure (e.g., at least one of the TFT, the data line DL, and the gate line GL) in the liquid crystal cell 10 on the first substrate 101 is avoided, and a load of the transparent display apparatus 1 is reduced.

Figure 19:
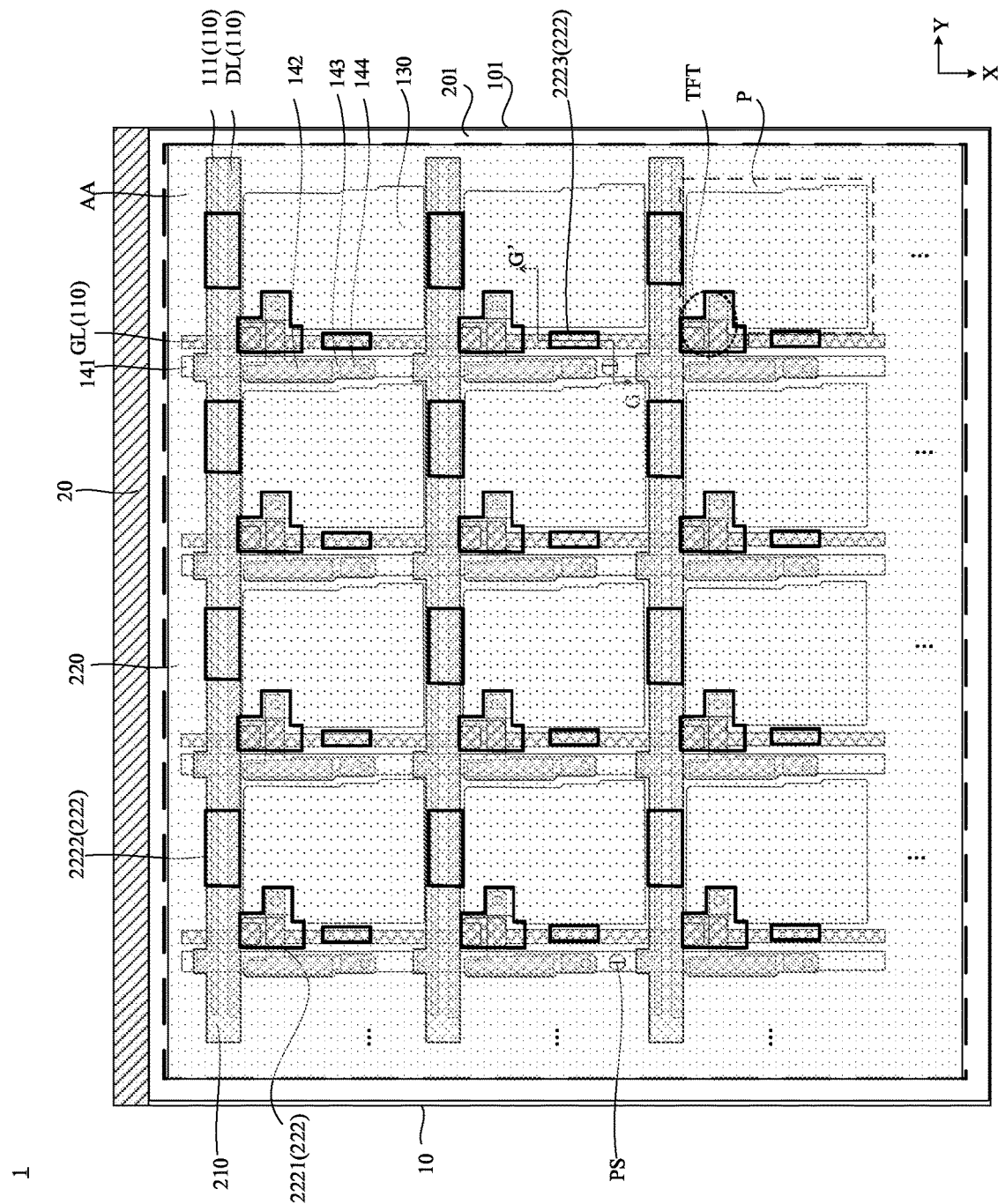
FIG. 19 is a structural diagram of yet another transparent display apparatus, in accordance with some embodiments of the present disclosure.
Figure 21:
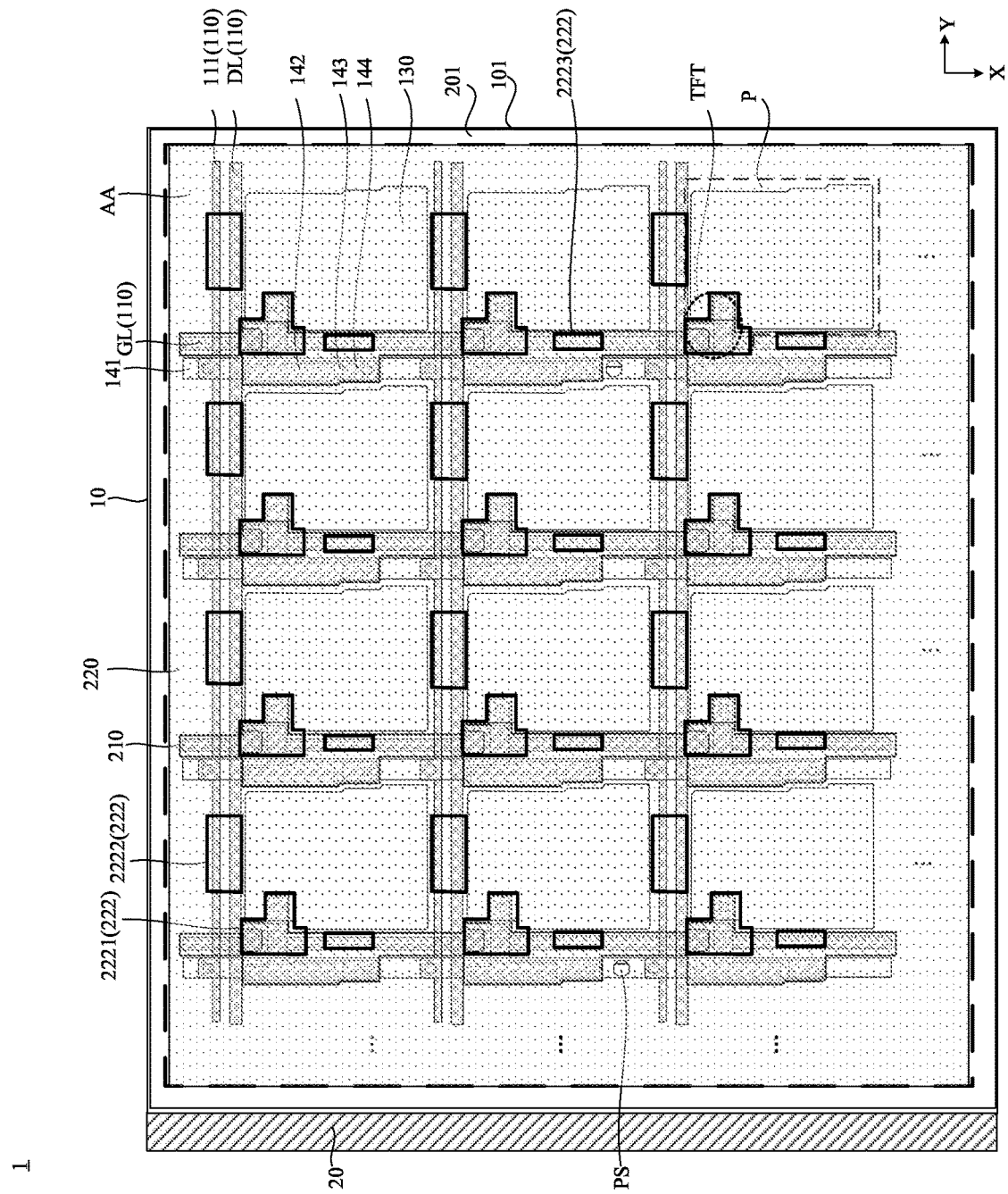
FIG. 21 is a structural diagram of yet another transparent display apparatus, in accordance with some embodiments of the present disclosure.

In some embodiments, referring to FIGS. 19 and 21, an orthogonal projection of at least one opening 222 of the plurality of openings 222 on the second substrate 201 is non-overlapping with the orthogonal projection of the light-shielding pattern 210 on the second substrate 201.

Figure 20:
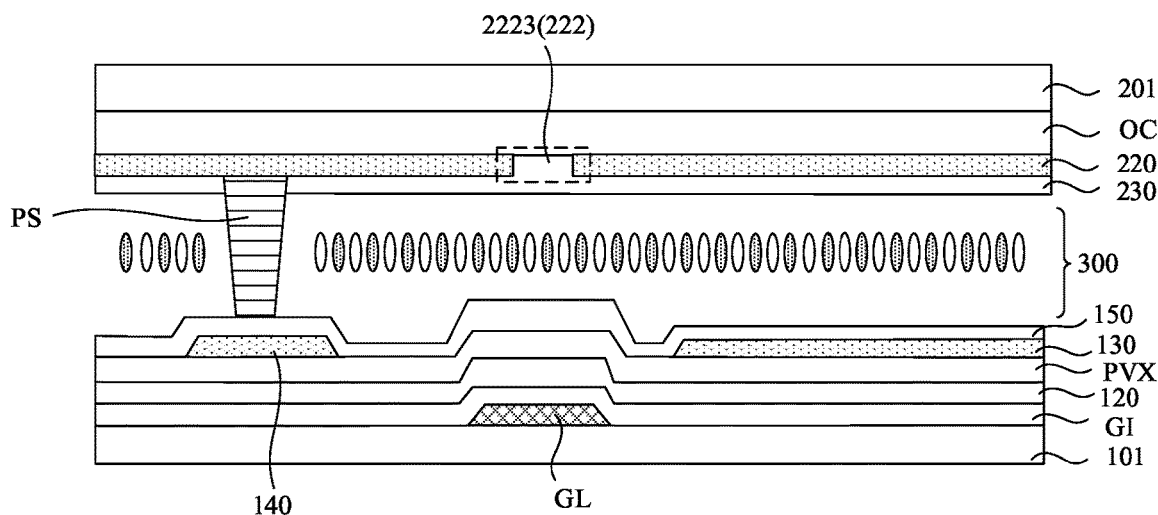
FIG. 20 is a sectional view of the transparent display apparatus in FIG. 19 taken along the line G-G'.

It may be understood that, in a case where the orthogonal projections of the first openings 2221 on the second substrate 201 are non-overlapping with the orthogonal projection of the light-shielding pattern 210 on the second substrate 201, the light will not be shielded by the light-shielding pattern 210 after passing through the region where the first openings 2221 are located, thereby improving the transmittance of the transparent display apparatus 1. In a case where the orthogonal projections of the second openings 2222 on the second substrate 201 are non-overlapping with the orthogonal projection of the light-shielding pattern 210 on the second substrate 201, the light will not be shielded by the light-shielding pattern 210 after passing through the region where the second openings 2222 are located, thereby improving the transmittance of the transparent display apparatus 1. In a case where the orthogonal projections of the third openings 2223 on the second substrate 201 are non-overlapping with the orthogonal projection of the light-shielding pattern 210 on the second substrate 201, the light will not be shielded (as shown in FIG. 20) by the light-shielding pattern 210 after passing through the region where the third openings 2223 are located, thereby improving the transmittance of the transparent display apparatus 1.

In addition, at least one opening 222 may prevent an electric field from being formed at a position where the orthogonal projection of the second electrode 220 on the first substrate 101 overlaps with the orthogonal projection of the conductive structure (e.g., at least one of the TFT, the data line DL, and the gate line GL) in the liquid crystal cell 10 on the first substrate 101, which will result in an abnormality in a process of driving the liquid crystal layer 110, and the liquid crystal cell 10 will emit light abnormally.

In some embodiments, as shown in FIGS. 12A, 13, and 15, the liquid crystal cell 10 further includes a plurality of post spacer (PS) disposed on the second substrate 201. The plurality of post spacers PS are farther from the second substrate 201 than the light-shielding pattern 210.

For example, in the thickness direction of the liquid crystal cell 10, a height of the post spacer PS is about 3.6 µm.

An orthogonal projection of the spacer PS on the first substrate 101 overlaps with an orthogonal projection of a first conductive pattern 141 on the first substrate 101.

It may be understood that, the post spacers PS may play a stabilization role for the liquid crystal cell 10, and may improve a stabilization performance of the transparent display apparatus 1 in a process of the transparent display apparatus 1 being pressed.

It will be noted that the size of the post spacer PS is small, whose influence on the transmittance of the transparent display apparatus 1 is small and can be ignored.

Figure 22:
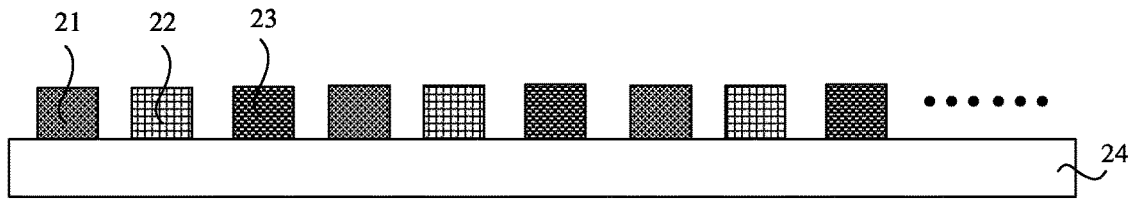
FIG. 22 is a structural diagram of a light source, in accordance with some embodiments of the present disclosure.

In some embodiments, as shown in FIG. 22, the light source 20 includes first color light-emitting devices 21, second color light-emitting devices 22 and third color light-emitting devices 23.

For example, as shown in FIG. 22, the light source 20 includes a circuit board 24, and the first color light-emitting device 21, the second color light-emitting device 22 and the third color light-emitting device 23 are all disposed on the circuit board 24.

The light source 20 is configured such way that, in response to a pulse control signal, the first color light-emitting devices 21, the second color light-emitting devices 22 and the third color light-emitting devices 23 emit light with respective colors sequentially and periodically.

The first color, the second color and the third color are three primary colors. For example, the first color is red, the second color is green, and the third color is blue.

For example, each light-emitting device may be a light-emitting diode (LED), a micro light-emitting diode (Micro-LED), a mini light-emitting diode (Mini-LED), an organic light-emitting diode (OLED) or the like.

For example, the light source 20 further includes a light-emitting control circuit, coupled to each light-emitting device in the light source 20. The light-emitting control circuit is configured to output the pulse control signal to control an operation period of each light-emitting device in the light source 20. The light-emitting control circuit may be disposed on the circuit board 24. Alternatively, the transparent display apparatus 1 further includes a timing controller (Tcon), the light source 20 may be coupled to the timing controller, and the timing controller is configured to output the pulse control signal to control the operation period of each light-emitting device in the light source 20.

In this case, the light source 20 may emit light with the first color, light with the second color and light with the third color periodically, so that the light from the light source 20 incident to the liquid crystal cell 10 is color light. Therefore, in the display process, the liquid crystal cell 10 may emit color light for color display. In this way, there is no need to provide a color film on a light-emitting side of the liquid crystal cell 10, thereby saving costs.

It will be understood that, in a case where the liquid crystal layer 300 includes the liquid crystal molecules and the polymer molecules, when the first color light-emitting device 21 emits the light with the first color, pixel regions P that are to display the first color in the transparent display apparatus 1 are in a scattering state under electric driving, and the other pixel regions P are in a transparent state; when the second color light-emitting device 22 emits the light with the second color, pixel regions P that are to display the second color in the transparent display apparatus 1 are in the scattering state under the electric driving, and the other pixel regions P are in the transparent state; and when the third color light-emitting device 23 emits the light with the third color, pixel regions P that are to display the third color in the transparent display apparatus 1 are in the scattering state under the electric driving, and the other pixel regions P are in the transparent state.

It will be noted that, a person skilled in the art may adjust a duty ratio of the pulse control signal according to actual display situations to control respective light-emitting periods of the first color light-emitting devices 21, the second color light-emitting devices 22 and the third color light-emitting devices 23.

In some embodiments, as shown in FIG. 14, the liquid crystal cell 10 further includes an over coat (OC) disposed on the second substrate 201 and located on the side of the light-shielding pattern 210 proximate to the first substrate 101. The surface of the over coat OC away from the second substrate 201 is flat. In this case, in a case where the second electrode 220 is located on the second substrate 201, the second electrode 220 is located on the side of the over coat OC away from the second substrate 201, so that a layer of the second electrode 220 may be flat, which improves the uniformity of the second electrode 220.

As shown in FIG. 14, the liquid crystal cell 10 further includes a first alignment layer 150 and a second alignment layer 230. The first alignment layer 150 is located on a side of the first substrate 101 proximate to the liquid crystal layer 300, and the second alignment layer 230 is located on a side of the second substrate 201 proximate to the liquid crystal layer 300. For example, in a case where the second electrode 220 is located on the first substrate 101, the first alignment layer 150 is closer to the liquid crystal layer 300 than the first electrodes 130 and the second electrode 220; in a case where the second electrode 220 is located on the second substrate 201, the second alignment layer 230 is closer to the liquid crystal layer 300 than the second electrode 220.

For example, the materials of the first alignment layer 150 and the second alignment layer 230 are the same, for example, polyimide (PI) may be used. An alignment direction of the first alignment layer 150 and an alignment direction of the second alignment layer 230 are antiparallel to each other. For example, the first alignment layer 150 and the second alignment layer 230 may be aligned by means of rubbing alignment or photo alignment in the process. For example, the alignment direction of the first alignment layer 150 is parallel to and opposite to the alignment direction of the second alignment layer 230.

In addition, the transparent display apparatus 1 may be any apparatus that can displays images whether in motion (e.g., a video) or stationary (e.g., a static image), and whether literal or graphical. More specifically, it is anticipated that the described embodiments may be implemented in or associated with a variety of electronic devices, which include (but are not limited to) a watch, a clocks, a calculator, a television monitor, a flat panel display, a computer monitor, an automotive display (e.g., an odometer display), a navigator, a cockpit controller and/or display, a display of camera view (e.g., a display of rear view camera in a vehicle), an electronic photo, an electronic billboard or sign, a projector, a building structure, packaging, and an aesthetic structure (e.g., a display for an image of a piece of jewelry).

For example, the transparent display apparatus 1 may be applied to occasions, such as vehicle-mounted displays, window displays, shopping mall advertisements, museum displays, refrigerator doors, building media and the like.

For example, the transparent display apparatus 1 may be used as a car window. For example, a portion or all of a front windshield may be replaced with the transparent display apparatus; alternatively, the transparent display apparatus may be attached to the front windshield to cover the portion or the all of the front windshield. The portion of the front windshield is replaced with the transparent display apparatus, which means that an opening may be provided in the front windshield and the transparent display apparatus 1 is embedded in the opening. In this way, the transparent display apparatus 1 not only functions as the front windshield, but also displays images. In a case where the transparent display apparatus 1 is applied to the front window of the car, information on a dashboard of the car and navigation information on a map may be displayed on the front window of the car, so that a driver can see a road ahead while viewing the dashboard and the map, thereby providing the driver with a good driving experience.

For example, the transparent display apparatus 1 may be applied to a window display cabinet (also referred to as a display cabinet), which includes a box and the transparent display apparatus 1 disposed on a side of the box, where the box has a certain receiving space for receiving an item to be displayed. A surface of the window display cabinet provided with the transparent display apparatus 1 may be referred to as a display surface. For example, the item to be displayed is a notebook computer, the display surface of the window display cabinet may display information about parameters, a price and application scenes of the item to be displayed, so that the viewer may have a deep understanding of the product. In addition, at least a portion of an inner surface of the box may be set to be white. In this way, a portion of light scattered to the receiving space of the box may be reflected by the inner surface of the box onto the item to be displayed, so as to provide good ambient light for the item to be displayed; and another portion of the light scattered to the receiving space of the box may be emitted from the display surface through the transparent display apparatus 1, thereby improving brightness of the transparent display apparatus 1.

For example, an opening or a recess may be provided on the refrigerator door, and the transparent display apparatus 1 may be disposed in the opening or the recess. In addition, at least one of a touch structure and an audio player may be integrated into the transparent display apparatus 1. In this way, a user can observe a situation inside a refrigerator even if he/she does not open the refrigerator door. Moreover, a human-computer interaction interface may be displayed on the transparent display apparatus 1, the user can operate on the transparent display apparatus 1 through the human-computer interaction interface, and the transparent display apparatus 1 senses the user's operation through the touch structure. For example, a temperature set by the user and a temperature adjustment image are displayed on the transparent display apparatus 1, and the user can adjust the set temperature by pressing the temperature adjustment image; in addition, a control interface of the audio player may be displayed on the transparent display apparatus 1, and the audio player can be turned on to play audios by operating on the control interface, thereby expanding an application scope of the transparent display apparatus 1.

Figure 23:
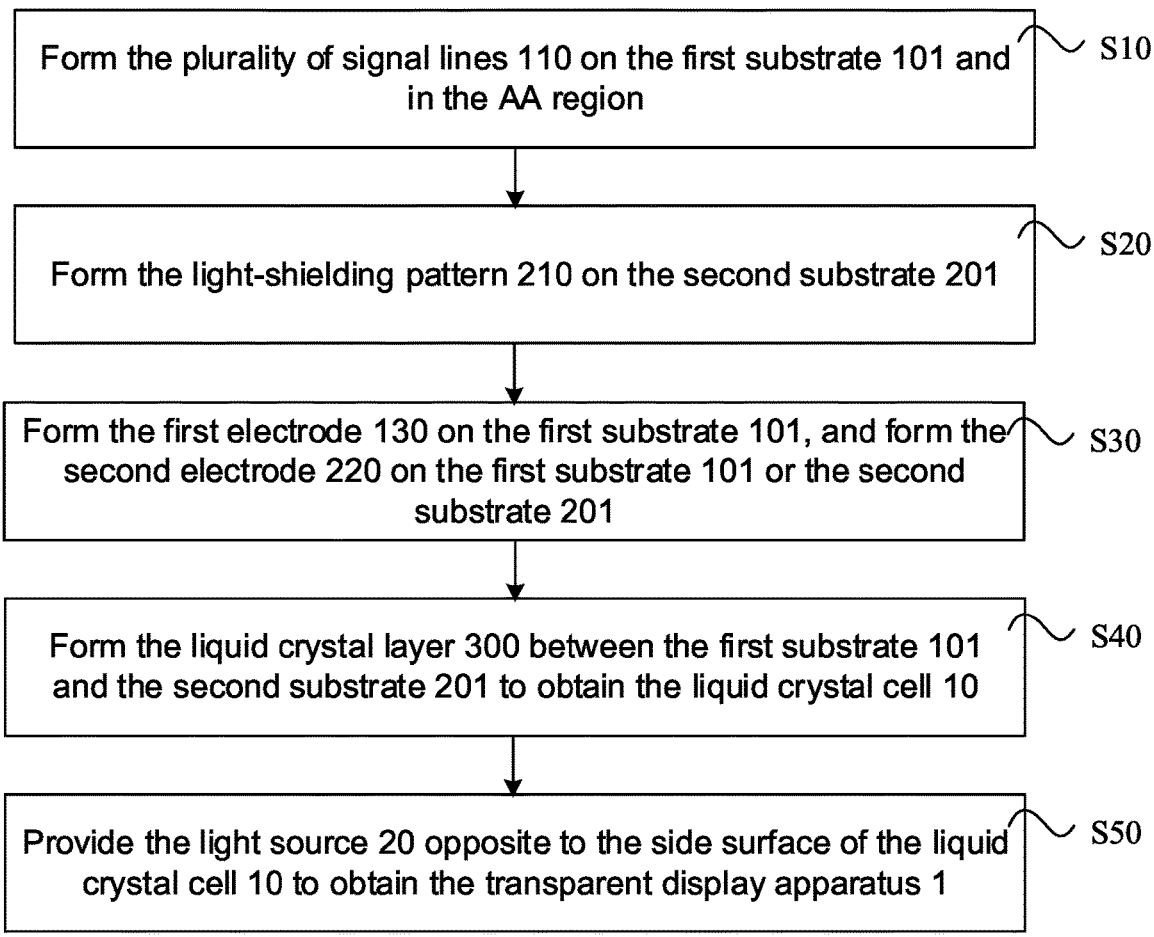
FIG. 23 is a manufacturing flow diagram of the transparent display apparatus, in accordance with some embodiments of the present disclosure.

Embodiments of the present disclosure provide a method of manufacturing a transparent display apparatus. The manufacturing method may be used to obtain the transparent display apparatus 1 in any one of the embodiments described above. As shown in FIG. 23, the manufacturing method includes the following steps.

In step S10, referring to FIGS. 13 to 15, the plurality of signal lines 110 are formed on the first substrate 101 and in the display region (AA region).

In step S20, referring to FIGS. 13 to 15, the light-shielding pattern 210 is formed on the second substrate 201.

In step S30, the first electrode 130 is formed on the first substrate 101, and the second electrode 220 is formed on the first substrate 101 or the second substrate 201.

In step S40, the liquid crystal layer 300 is formed between the first substrate 101 and the second substrate 201 to obtain the liquid crystal cell 10.

In step S50, referring to FIGS. 13 to 15, the light source 20 is disposed opposite to the side surface of the liquid crystal cell 10 to obtain the transparent display apparatus 1.

Referring to FIGS. 2 and 3, the at least one of the plurality of signal lines 110 has the bottom surface 110A proximate to the first substrate 101 and the light-reflecting side surface 110B connected to the bottom surface 110A and facing the light source 20. The slope angle γ provided by the light-reflecting side surface 110B and the bottom surface 110A is the acute angle. The light-shielding pattern 210 is located in the reflection path after the portion of the light emitted by the light source 20 irradiates the light-reflecting side surface 110B. The liquid crystal layer 300 includes the liquid crystal molecules 301 and the polymer molecules 302. The liquid crystal layer 300 is configured to totally reflect or scatter the light incident to the region, opposite to the first electrode 130, of the liquid crystal layer 300 due to the action of the electric field provided by the first electrode 130 and the second electrode 220.

For example, the material in which the light-shielding pattern 210 is to be formed may be deposited on the second substrate 201 to form a light-shielding film, and the light-shielding film may be patterned to form the light-shielding pattern 210.

It will be noted that an order of forming the structures on the first substrate and forming the structures on the second substrate is not limited. For example, the structures may be formed on the second substrate first, and then the structures may be formed on the first substrate. In addition, an order of forming the plurality of signal lines, the first electrodes and the second electrode on the first substrate may be adjusted according to the actual situations, which is not limited herein. For example, the plurality of signal lines and the first electrodes may be formed on the first substrate first, and then the second electrode may be formed; alternatively, the plurality of signal lines and the second electrode may be formed first, and then the first electrodes may be formed.

Figure 24:
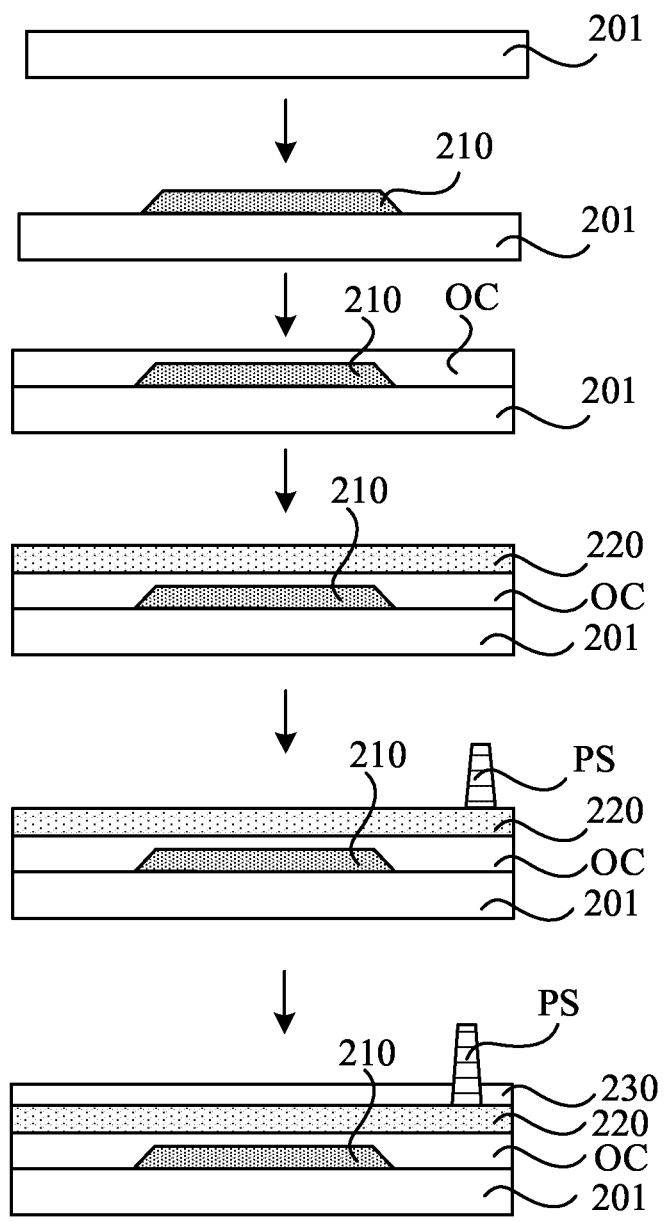
FIG. 24 is a manufacturing process diagram of an opposite substrate, in accordance with some embodiments of the present disclosure.

For example, referring to FIG. 15, forming an opposite substrate including the second substrate 201 and the second electrode 220 formed on the second substrate 201 includes: as shown in FIG. 24, depositing a material to be formed into the over coat OC on the second substrate 201 and on the side of the light-shielding pattern 210 away from the second substrate 201 to form the over coat OC; depositing a transparent conductive material on the side of the over coat OC away from the second substrate 201 to form the second electrode 220; forming the post spacers PS on the side of the second electrode 220 away from the second substrate 201; and coating the side of the post spacers PS away from the second substrate 201 with a material to be formed into the second alignment layer 230 to form a second alignment film, and subjecting the second alignment film to rubbing alignment or photo alignment to obtain the second alignment layer 230.

It will be noted that, the manufacturing method of the above transparent display apparatus has the same beneficial effects as the transparent display apparatus 1 in some of the embodiments described above, which will not be repeated herein.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A transparent display apparatus, comprising:
   a liquid crystal cell having a display region; and
   a light source disposed opposite to a side surface of the liquid crystal cell, wherein the liquid crystal cell includes:
   a first substrate;
   first electrodes disposed on the first substrate;
   a second substrate;
   a second electrode disposed on one of the first substrate and the second substrate;
   a liquid crystal layer disposed between the first substrate and the second substrate; the liquid crystal layer including polymer molecules and liquid crystal molecules, and the liquid crystal layer being configured to totally reflect or scatter light emitted by the light source incident to a region, opposite to a first electrode of the first electrodes, in the liquid crystal layer due to action of an electric field provided by the first electrode and the second electrode;
   a plurality of signal lines disposed on the first substrate and located in the display region, wherein at least one signal line of the plurality of signal lines has a bottom surface proximate to the first substrate and a light-reflecting side surface connected to the bottom surface and facing the light source, and a slope angle provided by the light-reflecting side surface and the bottom surface is an acute angle; and
   a light-shielding pattern disposed on the second substrate, the light-shielding pattern being located in a reflection path after a portion of the light emitted by the light source irradiates the light-reflecting side surface;
   wherein the plurality of signal lines include gate lines, data lines and power lines, wherein an extending direction of the gate lines intersects an extending direction of the signal lines, the power lines and the data lines extend in the same direction and are disposed at intervals; and the power lines are made of a same material as the data lines;
   the display region includes a plurality of pixel regions, and each pixel region is provided with a first electrode of the first electrodes therein;
   the liquid crystal cell further includes:
   thin film transistors disposed on the first substrate, wherein each pixel region is further provided with a thin film transistor of the thin film transistors therein, the thin film transistor is closer to the first substrate than the first electrode, and the thin film transistor includes a gate, an active layer, a source and a drain, wherein the gate of the thin film transistor is coupled to a gate line of the gate lines, the source of the thin film transistor is coupled to a data line of the data lines, and the drain of the thin film transistor is coupled to the first electrode;
   the liquid crystal cell further includes:
   first conductive patterns disposed in a same layer as the first electrodes;
   second conductive patterns disposed in another same layer as the data lines; and
   third conductive patterns disposed in yet another same layer as the gate lines, wherein a first conductive pattern of the first conductive patterns is coupled to a power line of the power lines and a third conductive pattern of the third conductive patterns;
   a second conductive pattern of the second conductive patterns is coupled to the drain of the thin film transistor;
   an orthogonal projection of the third conductive pattern on the first substrate overlaps with an orthogonal projection of the second conductive pattern on the first substrate;
   the first conductive patterns and the gate lines extend in the same direction; and
   the first conductive pattern includes unshielded portions each located between two adjacent first electrodes of the first electrodes;
   an orthogonal projection of the unshielded portion on the first substrate is non-overlapping with the orthogonal projection of the second conductive pattern on the first substrate and the orthogonal projection of the third conductive pattern on the first substrate, and an orthogonal projection of the unshielded portion on the second substrate is non-overlapping with an orthogonal projection of the light-shielding pattern on the second substrate.

2. The transparent display apparatus according to claim 1, wherein an orthogonal projection of the at least one of the plurality of signal lines on the first substrate is within an orthogonal projection of the light-shielding pattern on the first substrate.

3. The transparent display apparatus according to claim 1, wherein an orthogonal projection of the at least one signal line on the first substrate has a first edge and a second edge;
   an orthogonal projection of a corresponding portion of the light-shielding pattern on the first substrate has a third edge and a fourth edge, the corresponding portion of the light-shielding pattern is a portion of the light-shielding pattern whose orthogonal projection on the first substrate overlaps with the orthogonal projection of the at least one signal line;

in a width direction of the at least one signal line, the first edge and the second edge are located opposite to each other;

the third edge is located on a side of the first edge away from the second edge, and the fourth edge is located on a side of the second edge away from the first edge; and a sum of a distance between the third edge and the first edge and a distance between the fourth edge and the second edge is greater than or equal to 6 μm.

4. The transparent display apparatus according to claim 3, wherein the distance between the third edge and the first edge is equal to the distance between the fourth edge and the second edge.

5. The transparent display apparatus according to claim 3, wherein a ratio of a width of a bottom surface, proximate to the second substrate, of the corresponding portion of the light-shielding pattern to a width of the bottom surface of the at least one signal line ranges from 1 to 2.5, inclusive.

6. The transparent display apparatus according to claim 3, wherein a relationship between a width d of the bottom surface of the at least one signal line and a width D of a bottom surface, proximate to the second substrate, of the corresponding portion of the light-shielding pattern is $D=2L\times\tan(2\gamma+\alpha-90°)+d$, wherein L is a distance between the bottom surface of the at least one signal line and the bottom surface, proximate to the second substrate, of the corresponding portion of the light-shielding pattern;

γ is the slope angle provided by the light-reflecting side surface and the bottom surface of the at least one signal line; and α is an included angle between the portion of the light incident on the light-reflecting side surface of the at least one signal line and an extend surface of the bottom surface of the at least one signal line.

7. The transparent display apparatus according to claim 6, wherein a is greater than or equal to 0 degrees and less than or equal to 60 degrees ($0°\leq\alpha\leq60°$); and γ is greater than or equal to 45 degrees and less than or equal to 80 degrees ($45°\leq\gamma\leq80°$).

8. The transparent display apparatus according to claim 1, wherein a material of the plurality of signal lines includes a metal.

9. The transparent display apparatus according to claim 1, wherein an orthogonal projection of the thin film transistor on the first substrate is within an orthogonal projection of the light-shielding pattern on the first substrate.

10. The transparent display apparatus according to claim 1, wherein the orthogonal projection of the second conductive pattern on the first substrate and the orthogonal projection of the third conductive pattern on the first substrate are within an orthogonal projection of the light-shielding pattern on the first substrate.

11. The transparent display apparatus according to claim 1, wherein the second electrode is located on the second substrate, and is closer to the first substrate than the light-shielding pattern, and the second electrode includes:

a second electrode body; and a plurality of openings disposed in the second electrode body, the plurality of openings including at least one type of: first openings, second openings or third openings;

an orthogonal projection of a first opening of the first openings on the first substrate substantially coincides with an orthogonal projection of a thin film transistor of the thin film transistors on the first substrate; and an orthogonal projection of a second opening of the second openings on the first substrate overlaps with an orthogonal projection of a data line of the data lines on the first substrate, and an orthogonal projection of a third opening of the third openings on the first substrate overlaps with an orthogonal projection of a gate line of the gate lines on the first substrate.

12. The transparent display apparatus according to claim 11, wherein an orthogonal projection of at least one of the plurality of openings on the second substrate is non-overlapping with an orthogonal projection of the light-shielding pattern on the second substrate.

13. The transparent display apparatus according to claim 1, wherein the liquid crystal cell further includes:

a plurality of post spacers disposed on the second substrate, the plurality of post spacers being farther from the second substrate than the light-shielding pattern;

wherein an orthogonal projection of a post spacer of the plurality of post spacers on the first substrate overlaps with an orthogonal projection of a first conductive pattern of the first conductive patterns on the first substrate; and orthogonal projections of the plurality of post spacers on the second substrate are non-overlapping with an orthogonal projection of the light-shielding pattern on the second substrate.

14. The transparent display apparatus according to claim 1, wherein the light source includes first color light-emitting devices, second color light-emitting devices and third color light-emitting devices; and the light source is configured such way that the first color light-emitting devices, the second color light-emitting devices and the third color light-emitting devices emit light with respective colors sequentially and periodically, in response to a pulse control signal.

15. A method of manufacturing a transparent display apparatus, the method comprising:

forming a plurality of signal lines on a first substrate and in a display region;

forming a light-shielding pattern on a second substrate;

forming first electrodes on the first substrate;

forming a second electrode on one of the first substrate and the second substrate;

forming a liquid crystal layer between the first substrate and the second substrate to obtain a liquid crystal cell; and providing a light source opposite to a side surface of the liquid crystal cell to obtain the transparent display apparatus, wherein at least one signal line of the plurality of signal lines has a bottom surface proximate to the first substrate and a light-reflecting side surface connected to the bottom surface and facing the light source, and a slope angle provided by the light-reflecting side surface and the bottom surface is an acute angle; the light-shielding pattern is located in a reflection path after a portion of light emitted by the light source irradiates the light-reflecting side surface;

the liquid crystal layer includes polymer molecules and liquid crystal molecules, and the liquid crystal layer is configured to totally reflect or scatter the light emitted by the light source incident to a region, opposite to a first electrode of the first electrodes, in the liquid crystal layer due to action of an electric field provided by the first electrode and the second electrode;

the plurality of signal lines include gate lines, data lines and power lines, an extending direction of the gate lines intersects an extending direction of the signal lines; the power lines and the data lines extend in the same direction and are disposed at intervals; and the power lines are made of a same material as the data lines;

the display region includes a plurality of pixel regions, and each pixel region is provided with a first electrode of the first electrodes therein;

the method further includes:
- forming thin film transistors, first conductive patterns, second conductive patterns and third conductive patterns on the first substrate;
- wherein each pixel region is further provided with a thin film transistor of the thin film transistors therein, the thin film transistor is closer to the first substrate than the first electrode, and the thin film transistor includes a gate, an active layer, a source and a drain, wherein the gate of the thin film transistor is coupled to a gate line of the gate lines, the source of the thin film transistor is coupled to a data line of the data lines, and the drain of the thin film transistor is coupled to the first electrode;
- the first conductive patterns are disposed in a same layer as the first electrodes;
- the second conductive patterns are disposed in another same layer as the data lines; and the third conductive patterns are disposed in yet another same layer as the gate lines;
- a first conductive pattern of the first conductive patterns is coupled to a power line of the power lines and a third conductive pattern of the third conductive patterns;
- a second conductive pattern of the second conductive patterns is coupled to the drain of the thin film transistor; and
- an orthogonal projection of the third conductive pattern on the first substrate overlaps with an orthogonal projection of the second conductive pattern on the first substrate; and
- the first conductive patterns and the gate lines extend in the same direction;
- the first conductive pattern includes unshielded portions each located between two adjacent first electrodes of the first electrodes;
- an orthogonal projection of the unshielded portion on the first substrate is non-overlapping with the orthogonal projection of the second conductive pattern on the first substrate and the orthogonal projection of the third conductive pattern on the first substrate, and an orthogonal projection of the unshielded portion on the second substrate is non-overlapping with an orthogonal projection of the light-shielding pattern on the second substrate.

* * * * *